(12) United States Patent
Doi et al.

(10) Patent No.: US 8,086,262 B2
(45) Date of Patent: Dec. 27, 2011

(54) INFORMATION TERMINAL DEVICE

(75) Inventors: Masayuki Doi, Tokyo (JP); Akiho Shibata, Tokyo (JP)

(73) Assignee: Vodafone Group PLC, Newbury, Berkshire (GB)

(*) Notice: Subject to any disclaimer, the term of this patent is extended or adjusted under 35 U.S.C. 154(b) by 565 days.

(21) Appl. No.: 11/666,169

(22) PCT Filed: Oct. 26, 2005

(86) PCT No.: PCT/JP2005/019731
§ 371 (c)(1),
(2), (4) Date: Apr. 25, 2007

(87) PCT Pub. No.: WO2006/046622
PCT Pub. Date: May 4, 2006

(65) Prior Publication Data
US 2007/0249385 A1 Oct. 25, 2007

(30) Foreign Application Priority Data
Oct. 28, 2004 (JP) ................................ 2004-313498

(51) Int. Cl.
*H04M 1/00* (2006.01)
(52) U.S. Cl. .................. 455/550.1; 455/566; 455/154.2; 345/625; 345/634; 345/643; 345/676; 345/502; 345/522; 345/23; 379/29.1; 379/433.04
(58) Field of Classification Search .................. 455/566, 455/154.2, 550.1; 345/625, 634, 643, 676, 345/502, 522, 23; 379/29.1, 433.04
See application file for complete search history.

(56) References Cited

U.S. PATENT DOCUMENTS 6,629,635 B1* 10/2003 Akamine ........................ 235/375
7,133,369 B1* 11/2006 Kennamer et al. ............ 370/254
2003/0231338 A1* 12/2003 Haga ............................. 358/1.15
2004/0243419 A1* 12/2004 Wang ............................. 704/277
2004/0267645 A1* 12/2004 Pollari ............................. 705/34

FOREIGN PATENT DOCUMENTS

| JP | 8-328880 A | 12/1996 |
| JP | 11-25119 A | 1/1999 |
| JP | 2002-82855 A | 3/2002 |
| JP | 2002-244802 A | 8/2002 |
| JP | 2002-297400 A | 10/2002 |
| JP | 2004-126735 A | 4/2004 |

* cited by examiner

*Primary Examiner* — Kamran Afshar
*Assistant Examiner* — Edward Zhang
(74) *Attorney, Agent, or Firm* — Muirhead and Saturnellii, LLC

(57) ABSTRACT

To provide an information terminal device contributing to prevention of an operation not intended by a user. A communication management unit (512) of an SVG processing unit (510) displays an image (confirmation image) for requesting a user to perform a confirmation input to confirm whether to be connected to the network before performing network connection according to the definition of a link definition unit (630) in the SVG content (600). When the user rejects the network connection, the link defined by the link definition unit (630) is not referenced. On the other hand, when the user permits the network connection, the communication management unit (512) requests the data of the address defined by the link definition unit (630) from the HTTP server (10) or the like specified in the address. Upon reception of a response to this, a communication state display unit (513) displays the data reception state according to the report from a communication state report unit (121).

14 Claims, 23 Drawing Sheets

FIG. 4 test. svg     <u>600</u>

```
<?xml version="1.0" standalone="no"?>
<!DOCTYPE svg PUBLIC "-//W3C//DTD SVG
20000629//EN"
"http://www.w3.org/TR/2000/WD-SVG-20000629/D
TD/svg-20000629.dtd">

<svg width="100" height="100">
<a xlink:href="http://www.w3.org">
<rect style="fill:none; stroke:black;" width="35"
height="20" x="10" y="5" /></a>
<ellipse style="fill:none; stroke:black;" cx="40"
cy="30" rx="25" ry="20" />
<line style="stroke:black;" x1="0" y1="0" x2="40"
y2="30" />
</svg>
```

LINK DEFINITION UNIT 630 → points to `<a xlink:href="http://www.w3.org">`

DRAWING DEFINITION UNIT 610 → spans from `<rect...>` through `<line... />`

FIG. 5

Test. html

```
<HTML>
<BODY>
  DISPLAYED BY SVG !
<BR>
    <OBJECT DATA="test.svg" HEIGHT="80"
WIDTH="100" >
<BR>
  DETAILS ARE<a href="http://www.w3.org/Graphics/SVG/" >
  HERE</a>
       .
       .
</BODY>
</HTML>
```

MAILER ANCHOR

```
<?xml version="1.0" standalone="no"?>
<!DOCTYPE svg PUBLIC "-//W3C//DTD SVG
20000629//EN"
"http://www.w3.org/TR/2000/WD-SVG-20000629/D
TD/svg-20000629.dtd">

<svg width="100" height="100">
<a xlink:href="mailto:a@vodafone.co.jp">
<rect style="fill:none; stroke:black;" width="35"
height="20" x="10" y="5" /></a>
<ellipse style="fill:none; stroke:black;" cx="40"
cy="30" rx="25" ry="20" />
<line style="stroke:black;" x1="0" y1="0" x2="40"
y2="30" />
</svg>
```

ANCHOR DEFINITION UNIT 620

FIG. 21

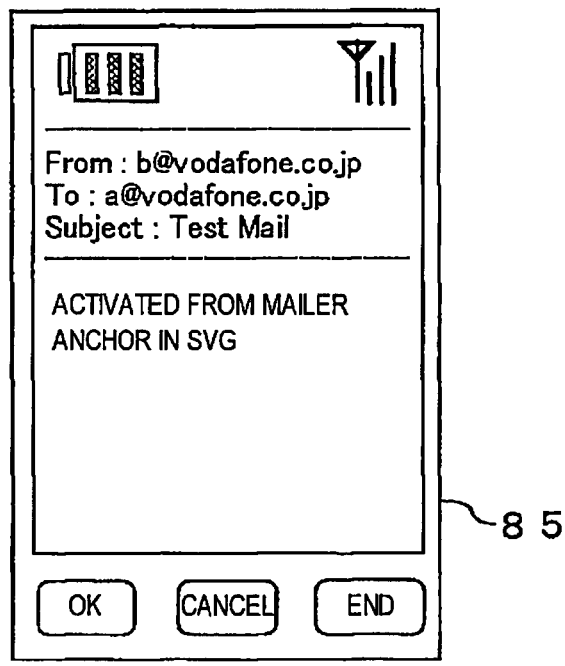

FIG. 22 test1.svg     <u>600</u>

```
<?xml version="1.0" standalone="no"?>
<!DOCTYPE svg PUBLIC "-//W3C//DTD SVG 20000629//EN"
"http://www.w3.org/TR/2000/WD-SVG-20000629/DTD/svg-20000629.dtd">

<svg width="100" height="100">
<a xlink:href="http://www.w3.org">
<rect style="fill:none; stroke:black;" width="35" height="20" x="10" y="5" />
</a>
<ellipse style="fill:none; stroke:black;" cx="40" cy="30" rx="25" ry="20" />
<line style="stroke:black;" x1="0" y1="0" x2="40" y2="30" />

<rect x="45" y="30" width="35" height="20" rx="5" ry="5" style="fill:
rgb(225,225,225); stroke: rgb(0,0,0); stroke-width: 1"/>
<text x="65" y="40" style="fill: rgb(0,0,0); font-size: 10pt; text-anchor:
middle" xml: space="preserve">OK?</text>

<image x="10" y="15" width="40" height="30" xlink:href="test2.svg"/>

</svg>
```

DEFINITION OF INLINE DISPLAY →

FIG. 23

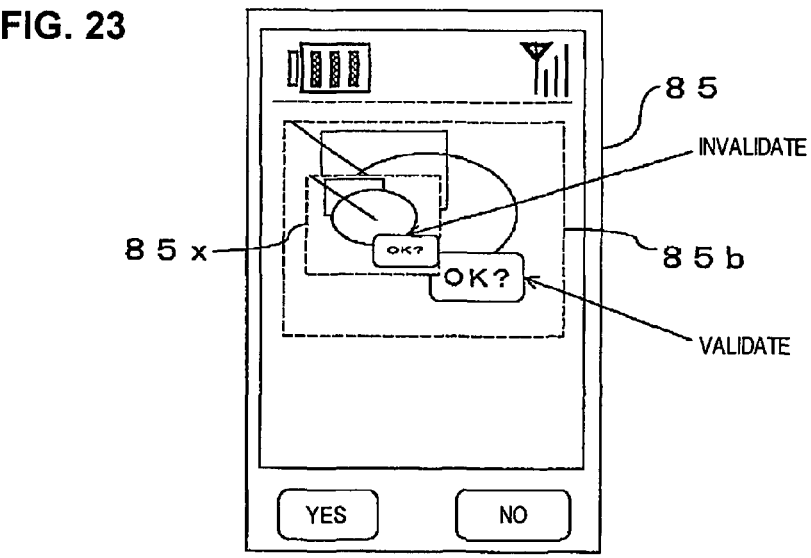

test_f.html                7 0 0

```
<HTML>
<BODY>
DISPLAYED BY Flash !
<BR>
   <OBJECT DATA="test.swf" HEIGHT="80" WIDTH="100" >
<BR>
DETAILES ARE HERE<a href="http://www.macromedia.com" ></a>
        .
        .
</BODY>
</HTML>
```

```
:
:
getURL("http://www.vodafone.com/");
```

```
:
:
on(Press) {
    getURL("http://www.vodafone.com/");
}
```

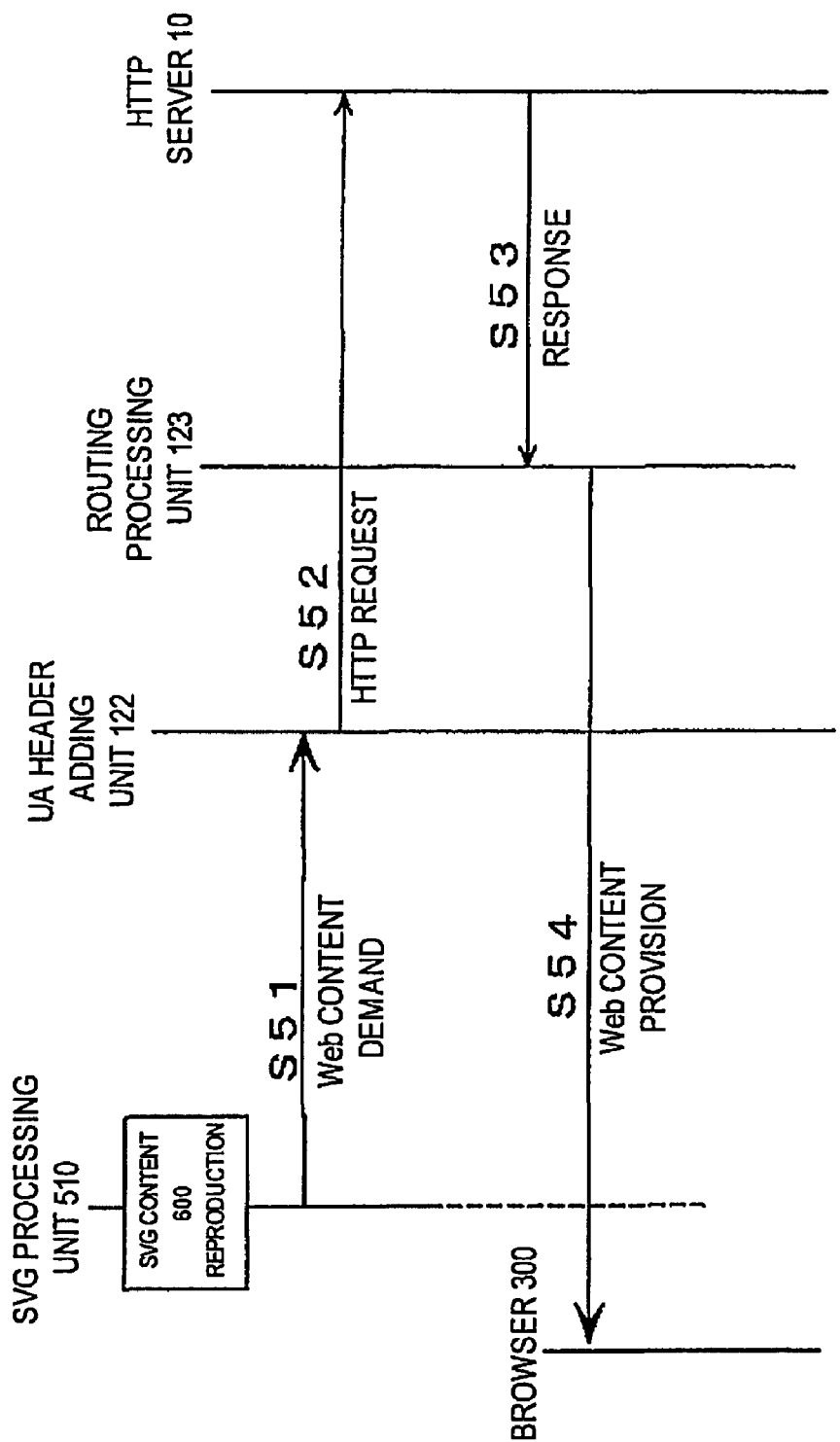

INFORMATION TERMINAL DEVICE

This is a national stage of the International Application No. PCT/JP2005/019731 filed Oct. 26, 2005 and published in Japanese.

BACKGROUND OF THE INVENTION

1. Field of the Invention

The present invention relates to an information terminal device contributing to prevention of an operation which is not intended by a user.

2. Description of the Conventional Art

A raster image, which expresses an image by pixels arranged in a grid shape, has a problem that a display becomes coarse by being enlarged. On the contrary, since a vector image expresses an image by line segments, the vector image can express a high-definition image even by being enlarged. An image data used in a cellular phone terminal has frequently employed the raster image conventionally, however, it is in the process of employing the vector image in correspondence to the high definition of a display device.

As a format of the vector image, for example, there has been known a scalable vector graphics (SVG) described by an extensible markup language (XML) (for example, refer to Ola Andersson and the other 64 persons' "Scalable Vector Graphics 1.1", Jan. 14, 2003, World Wide Web Consortium [online], [searched on Sep. 10, 2004], internet).

SUMMARY OF THE INVENTION

Problem to be Solved by the Invention

However, since a browser of the SVG is an application on a hyper text transfer protocol (HTTP), for example, it is possible to define a link or the like with respect to the other contents in the SVG content. When the SVG content mentioned above is reproduced by the cellular phone terminal as it is, there is a possibility that a communication is executed while the user does not know, at a time of demanding the other contents, and charging is done.

Further, since the cellular phone terminal is limited in a processing performance of an MPU, a memory capacity and the like, an operation becomes unstable if a condition of the SVG content to be reproduced is not limited, so that there is a possibility that an operation which is not intended by a user is executed.

The present invention is made by taking the problems mentioned above into consideration, and an object of the present invention is to provide an information terminal device which can contribute to prevention of an operation which is not intended by a user.

Means for Solving the Problem

In order to solve the problem mentioned above, in accordance with a first aspect of the present invention, there is provided an information terminal device comprising:

a drawing means executing a drawing process in accordance with a drawing definition information in page description data;

a data demanding means for demanding data from a provision device connected via a network in accordance with a link definition information in the page description data;

a confirming means confirming to a user whether or not network connection is to be executed in accordance with the demand; and a providing means providing the demand from the demanding means to the provision device in the case that the user selects the network connection.

In the information terminal device, the confirming means confirms to the user whether or not the network connection is to be executed, in accordance with the demand from the data demanding means, and in the case that the user selects the network connection, the providing means provides the demand from the demanding means to the provision device.

Further, in accordance with a second aspect of the present invention, there is provided an information terminal device as recited in the first aspect, wherein the information terminal device further comprises:

a data acquiring means capable of acquiring the data from the provision device connected via the network in accordance with the link definition information in the page description data;

a data volume monitoring means detecting a total of data volumes of the page description data and all the data acquired in accordance with the link definition information in the page description data; and a canceling means canceling the acquirement of the data by the data acquiring means, in the case that the total of the data volumes detected by the data volume monitoring means exceeds a predetermined threshold value.

In the information terminal device, in the case that the total of the data volumes detected by the data volume monitoring means exceeds the predetermined threshold value, the canceling means cancels the acquirement of the data by the data acquiring means.

Further, in accordance with a third aspect of the present invention, there is provided an information terminal device as recited in the first aspect, wherein the information terminal device further comprises an anchor processing means activating an external application in correspondence to the anchor definition information in the page description data. In the information terminal device, the anchor processing means activates the external application in correspondence to the anchor definition information in the page description data.

Further, in accordance with a fourth aspect of the present invention, there is provided an information terminal device as recited in the first aspect, wherein the providing means is provided with an adding means adding an identification information corresponding to the link definition information or demanded data to the demand transmitted to the providing means. In the information terminal device, the adding means adds the identification information corresponding to the link definition information or the demanded data to the demand transmitted to the providing means.

Further, in accordance with a fifth aspect of the present invention, there is provided an information terminal device as recited in the first aspect, wherein the information terminal device further comprises a link processing means activating an application in correspondence to the link definition information in the page description data. In this information terminal device, the link processing means activates the application in correspondence to the link definition information in the page description data.

Effect of the Invention

In the information terminal device in accordance with the first aspect of the present invention, since the confirming means confirms to the user whether or not the network connection is to be executed, in accordance with the demand from the data demanding means, and in the case that the user selects the network connection, the providing means provides the demand from the demanding means to the provision device, it is possible to acquire the data by executing the network connection only in the case that the selection by the user is made.

Accordingly, it is possible to prevent the network connection which is not intended by the user, and it is possible to contribute to prevention of the operation which is not intended by the user.

In the information terminal device in accordance with the second aspect of the present invention, in the case that the total of the data volume detected by the data volume monitoring means exceeds the predetermined threshold value, the canceling means cancels the acquisition of the data by the data acquiring means, whereby it is possible to set a limit to the total of the data volumes of all the data acquired in the display of the page description data.

Accordingly, it is possible to contribute to reservation of a suitable free memory capacity, and it is possible to contribute to prevention of the operation which is not intended by the user, through stabilization of the operation.

In the information terminal device in accordance with the third aspect of the present invention, since the anchor processing means activates the external application in correspondence to the anchor definition information in the page description data, it is possible to contribute to an improvement of a convenience of the user.

In the information terminal device in accordance with the fourth aspect of the present invention, since the adding means adds the identification information corresponding to the link definition information or the demanded data to the demand transmitted to the providing means, the providing device can know a state of the information terminal device, and can return a suitable response. Accordingly, it is possible to execute a suitable process also in the information terminal device, and it is possible to contribute to prevention of the operation which is not intended by the user.

In this information terminal device in accordance with the fifth aspect of the present invention, since the link processing means activates the application in correspondence to the link definition information in the page description data, it is possible to execute a reproduction of the page description data utilizing a process by the other application.

BRIEF EXPLANATION OF DRAWINGS

FIG. 4 is a view showing a specific example of the SVG content;

FIG. 5 is a view showing an example of a Web content in which a link with respect to the SVG content is described;

FIG. 20 is a view showing an example of the SVG content;

FIG. 21 is a view showing an example of an edit display by an e-mail client executed in the cellular phone terminal device;

FIG. 22 is a view showing an example of the SVG content;

FIG. 23 is a view showing an example of an image displayed on the display unit in correspondence to the SVG content;

FIG. 34 is a sequence view showing an example of a reproducing process of the content in the cellular phone terminal device.

DESCRIPTION OF REFERENCE NUMERALS

10 HTTP server, 20 SVG server, 30 Flash server, 40 mail server, 50 network, 60 mobile communication network, 70 mobile communication network, 73, 80 cellular phone terminal device, 83b data holding unit, 86 display control unit, 200 e-mail client, 300 browser, 400 Java (trade mark) execution environment, 500 reproduction processing unit, 510 SVG processing unit, 520 Flash processing unit

DETAILED ESCRIPTION OF PREFERED EMBODIMENT

The present invention can be, for example, applied to a mobile communication system which can execute a communication among a plurality of information terminal devices connected to a mobile communication network.

Embodiment 1

Whole Structure

Figure 1:
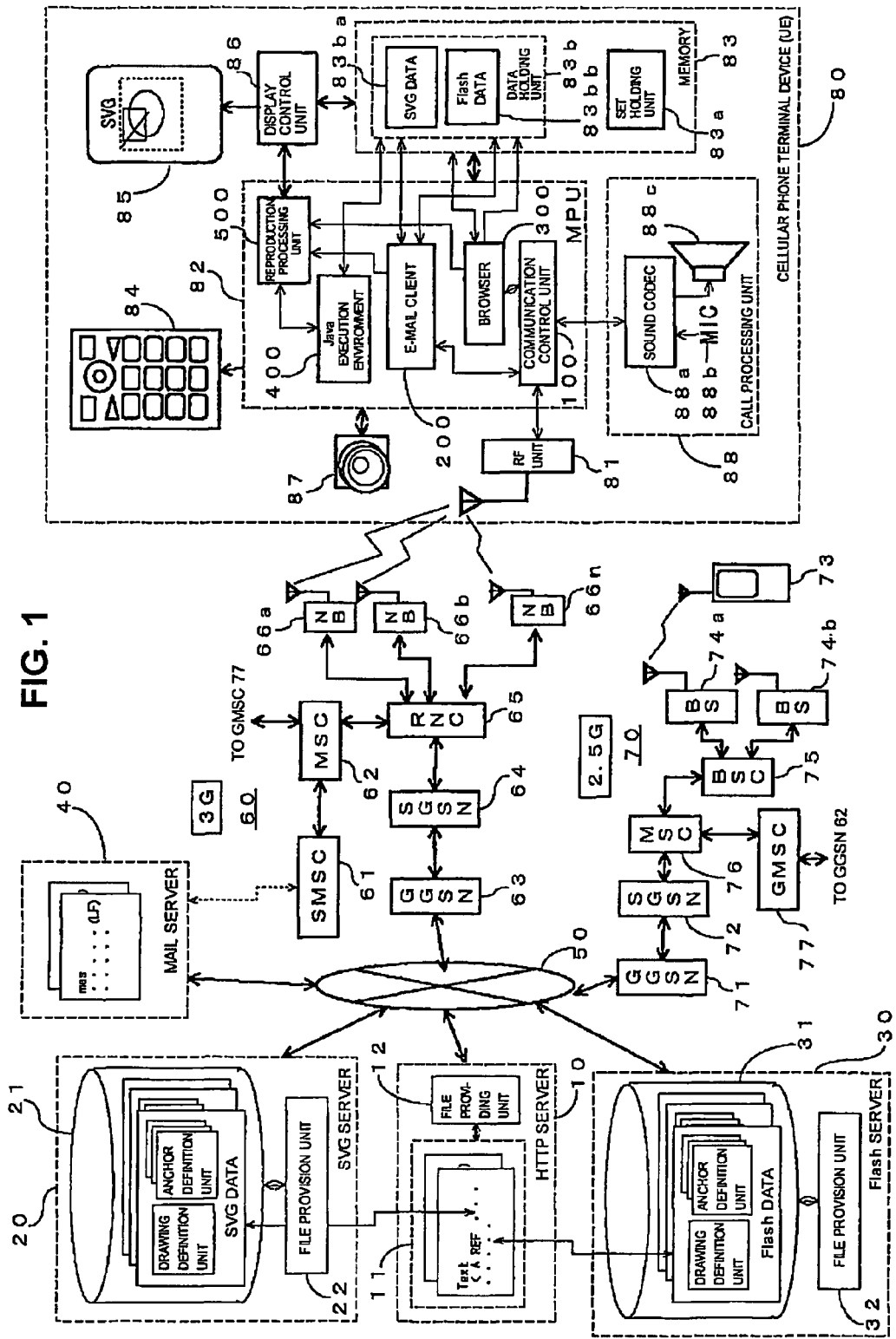
FIG. 1 is a block diagram showing a structure example of a mobile communication system in accordance with an embodiment 1 of the present invention.

A mobile communication system in accordance with an embodiment of the present invention is provided, for example, as shown in FIG. 1, with a hyper text transfer protocol (HTTP) server 10 providing a data (a Web content) such as a text data, an image data, a sound data and the like, an SVG server 20 providing a scalable vector graphics (SVG) content, a Flash server 30 providing a Flash content, a mail server 40 transmitting and receiving a message, a network 50 such as an internet or the like to which these servers and the like are connected, a mobile communication network 60, for example, constituted by a wideband-code division multiple access (W-CDMA) type mobile communication network, a mobile communication network 70, for example, constituted by personal digital cellular (PDC) type mobile communication network, a cellular phone terminal device (an information terminal device) 80 capable of utilizing a service such as a telephone call, a communication or the like through the mobile communication network 60.

The HTTP server 10, the SVC server 20, the Flash server 30 and the mail server 40 are constituted by an auxiliary memory device, for example, a micro processing unit (MPU), a memory, a hard disk drive (HDD) or the like, an input and output device, and an information processing device such as a personal computer (PC), a work station (WS) or the like having an input and output device such as a network interface, a keyboard, a display or the like, and serve as a function block shown in the drawing by executing an operating system (OS) and a control program held in the HDD or the like.

The HTTP server 10 provides the data such as the text data, the image data, the sound date and the like to the cellular phone terminal device 80 or a cellular phone terminal device 73 or the like. The Web content of a text (a character string) is provided in accordance with a page description data of, for example, a hyper text markup language (HTML) type, a mobile markup language (MML) type or the like, or in a text type or the like. The structure is made such that it is possible to define a link or the like with respect to the SVG content provided by the SVG server 20, and the Flash content provided by the Flash server 30, in the Web content. Further, the image data such as a wall paper, a photograph, a motion picture or the like is provided, for example, in accordance with a JPEG type, a PNG type or the like. Further, the sound data such as a melody signaling an incoming call, a sound signaling an incoming call or the like is provided, for example, in accordance with an SMD type, an MID type, an MP3 type or the like. The HTTP server 10 is provided with a data holding unit 11 holding the data, a file providing unit 12 providing the data in response to a request from the cellular phone terminal device 80 or the like.

The SVG server 20 is provided, for example, with a data holding unit 21 holding the SVG content, a file providing unit 22 providing the SVG content in response to the request from the cellular phone terminal device 80 or the like. Further, the Flash server 30 is provided, for example, with a data holding unit 31 holding the Flash content, and a file providing unit 32 providing the Flash content in response to the request from the cellular phone terminal device 80 or the like. In this case, the structure may be made such that the SVG content and the Flash content are stored in the HTTP server 10, and the file providing unit 12 provides the SVG content and the Flash content in response to the request from the cellular phone terminal device 80 or the like, in place of the SVG server 20 and the Flash server 30 being provided as the independent devices.

The mail server 40 employs a simple mail transfer protocol (SMTP) for transmitting a message, for example, from the cellular phone terminal device 80, and employs an internet message access protocol version 4 (IMAP4) or the like for providing a message to the cellular phone terminal device 80, thereby providing a mail service with respect to the cellular phone terminal device 80.

The mobile communication network 60 is constituted by a digital wireless communication network or the like, for example, employing a wideband code division multiple access (W-CDMA) system as a wireless access system, and a general packet radio service (GPRS) system as a core network system, and is provided with a short message service center (SMSC) 61 providing a short message service, a mobile switching circuit (MSC) 62 constructing a core network (CN), a gateway GPRS support Node (GGSN) 63, a serving GPRS support node (SGSN) 64, a radio network controller (RNC) 65 constructing a wireless access network, and base station devices (NB: node B) 66a, 66b, . . . , 66n.

Further, the mobile communication network 70 is provided with a GGSN 71 connected to the network 50, an SGSN 72 connected to the GGSN 71, base station devices (BS) 74a, 74b, . . . executing a wireless communication with respect to the mobile station (MS) 73 provided with a packet communication function called as a so-called 2.5 generation (2.5G), a base station controller (BSC) 75 executing a control of these BS 74a, 74b, . . . , an MSC 76, and a gate MSC (GMSC) 77 connected to the MSC 62.

The cellular phone terminal device 80 and 73 are provided with a mail communication function (an e-mail client) of transmitting and receiving an e-mail, and a browser function (a browser) of utilizing the data (the content) provided by the HTTP server 10, the SVG server 20, the Flash server 30 or the like, in addition to a telephone call function of calling with respect to the other cellular phone terminal device or a fixed phone terminal device. Further, the cellular phone terminal devices 80 and 73 can utilize the data provided by the other HTTP server (not shown) connected via the network 50.

(Structure of Cellular Phone Terminal Device 80)

The cellular phone terminal device 80 is provided with a radio frequency (RF) unit 81 executing a processing of a ratio frequency signal, an MPU 82, a memory 83, an operation key 84 inputting a command from the user or the like, a display unit 85 executing a display to the user, a display control unit 86 controlling the display by the display unit 85, a camera 87 imaging an image, and a call processing unit 88 executing processing of a sound communication. The call processing unit 88 is provided with a sound CODEC 88a executing an encoding/decoding of the sound signal, an MIC 88b and a speaker 88c.

The MPU 82 serves as a communication control unit 100 executing control of the communication via the mobile communication network 60, an e-mail client 200 utilizing the e-mail service provided by the mail server 10 and the SMSC 61, a browser 300 displaying the data provided by the HTTP server 30, the message of the e-mail or the like, a Java (trade mark) execution environment 400 executing a process described by a script language such as Java (trade mark) or the like, a reproduction processing unit 500 executing reproduction of the SVG content, and the flash content, and the like, for example, by executing a control program held in the memory 83.

Further, within the memory 83, there are provided a setting and holding unit 83*a* holding a set information, and a data holding unit 83*b* holding the data of the message, the text, the image, the sound and the like. In the data holding unit 83*b*, there are provided an SVG data holding unit 83*ba* holding the SVG content, and a Flash data holding unit 83*bb* holding the Flash content.

(Software Structure)

Figure 2:
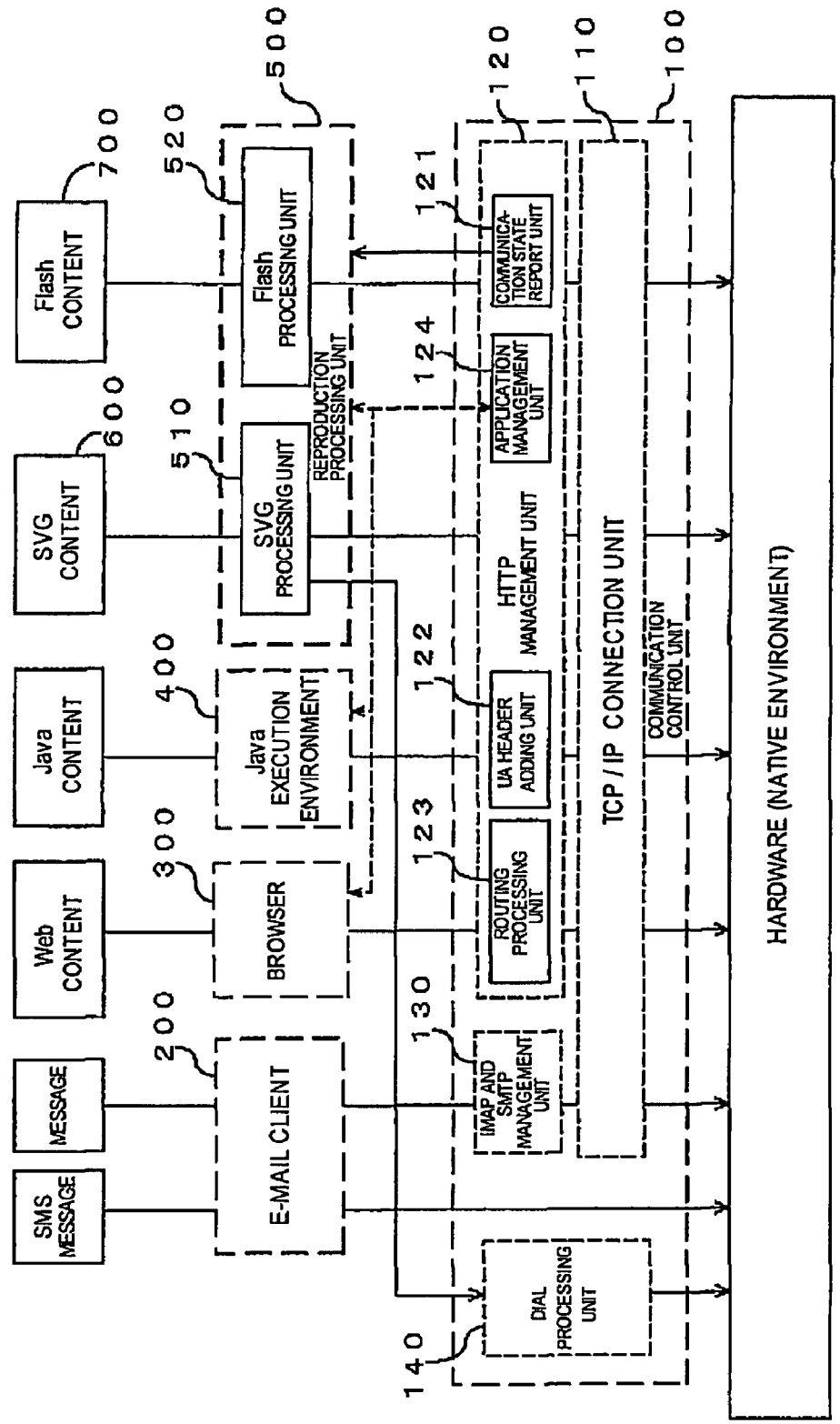
FIG. 2 is a block diagram showing a structure example of a software of a cellular phone terminal device constructing the mobile communication system.

A software executed by the MPU 82 of the cellular phone terminal device 80 structured as mentioned above has a hierarchical structure, for example, as shown conceptually in FIG. 2. The process of the communication control unit 100 is executed above an OS (a native environment) executing a management of a hardware in a lowest layer. The applications of the e-mail client 200, the browser 300, the Java (trade mark) execution environment 400, the reproduction processing unit 500 and the like are executed above the communication control unit 100. The reproduction processing unit 500 is provided with an SVG processing unit 510 reproducing the SVG content, and a Flash processing unit 520 reproducing the Flash content. The applications 200, 300, 400, 510 and 520 are structured such as to execute the communication process via the communication control unit 100.

The communication control unit 100 has a TCP/IP connection unit 110 executing a management of the communication by a TCP/IP protocol, an HTTP management unit 120 executing a management of the communication in accordance with the HTTP above the TCP/IP protocol, an IMAP and SMTP management unit 130 executing a management of the communication in accordance with an IMAP and SMTP, and a dial processing unit 140 executing a management of a dial by the communication processing unit 88. Further, the HTTP management unit 120 has a communication state report unit 121 reporting a communication state by the HTTP to the reproduction processing unit 500, a user agent header (UA header) adding unit 122 adding a user agent name to the HTTP request in response to the content request from each of the applications 300, 510 and 520, a routing processing unit 123 dividing the response to each of the applications 300, 510 and 520 in correspondence to the Content-Type in the HTTP response, and an application monitor unit 124 monitoring an operation of each of the applications 300, 400, 510 and 520.

(Details of SVG Content)

Figure 3:
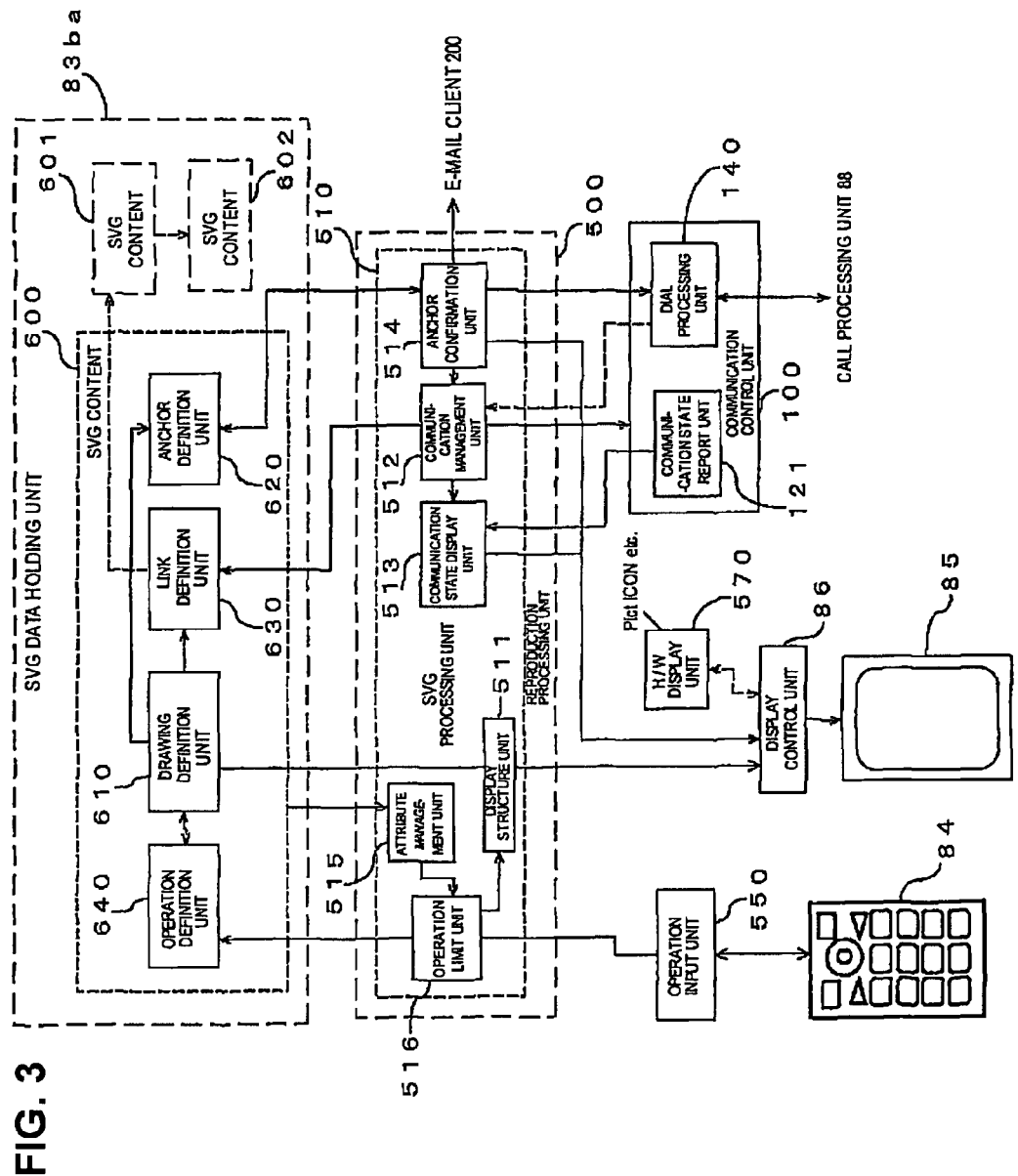
FIG. 3 is a view showing an SVG content displayed by the cellular phone terminal device and a structure example of an SVG processing unit.

Further, the SVG content has a drawing definition unit 610 in which a process for drawing a vector image or the like is defined, an anchor definition unit 620 in which a description of a dial processing (a dialer anchor), a description of a massage formation (a mailer anchor) and the like are defined, a link definition unit 630 in which a link of a reference file or the like is defined, and an operation definition unit 640 in which a process corresponding to a command input of the user is defined, for example, as shown in FIG. 3. Further, the structure is made such that a plurality of SVG contents 600, 601 and 602 can be held in the SVG data holding unit 83*ba*. In the example shown in FIG. 3, there is shown a state in which the SVG content 601 is linked by the link definition unit 630 of the SVG content 600, and the SVG content 602 is linked from the SVG content 601.

In this case, each of the definition units 610 to 640 mentioned above is not necessarily defined in all the SVG contents. For example, the link definition unit 630 does not exist in the SVG content (for example, the SVG content 602) which does not refer to the external file.

(Details of SVG Processing Unit 510)

Further, the SVG processing unit 510 mentioned above has a display structure unit 511 executing a process for drawing or the like in accordance with the definition of the drawing definition unit 610 so as to structure the display image, a communication management unit 512 executing the communication process such as the content request or the like in accordance with the definition of the link definition unit 630, a communication state display unit 513 executing a display of the communication state in accordance with the report from the communication state report unit 121 of the communication control unit 100, an anchor confirmation unit 514 executing a control of the dial processing unit 140 and the e-mail client 200 in accordance with the definition of the anchor definition unit 620, an attribute management unit 515 controlling the process by the display structure unit 511 in accordance with an operation state, and an operation limit unit 516 executing a limit of the operation in accordance with the command from the attribute management unit 515.

A predetermined file name (for example, "test.svg") is applied to the SVG content 600, for example, as shown in FIG. 4. Specifically, in the SVG content 600, for example, the drawing of a rectangle, an ellipse, a line or the like is defined, for example, in the drawing definition unit 610, and a link with respect to an external URL (http://www.w3.org) is defined by a tag <a> in the link definition unit 630.

(Outline of Operation)

The SVG content 600 mentioned above is acquired by the browser 300 from the SVG server 20 in accordance with a link information (OBJECT DATA . . . ) defined in the HTML document (the Web content) provided by the HTTP server 10, for example, as shown in FIG. 5. The structure is made such that the HTML document and the acquired SVG content 600 can be stored in the SVG data holding unit 83*ba* within the memory 83.

Figure 6:
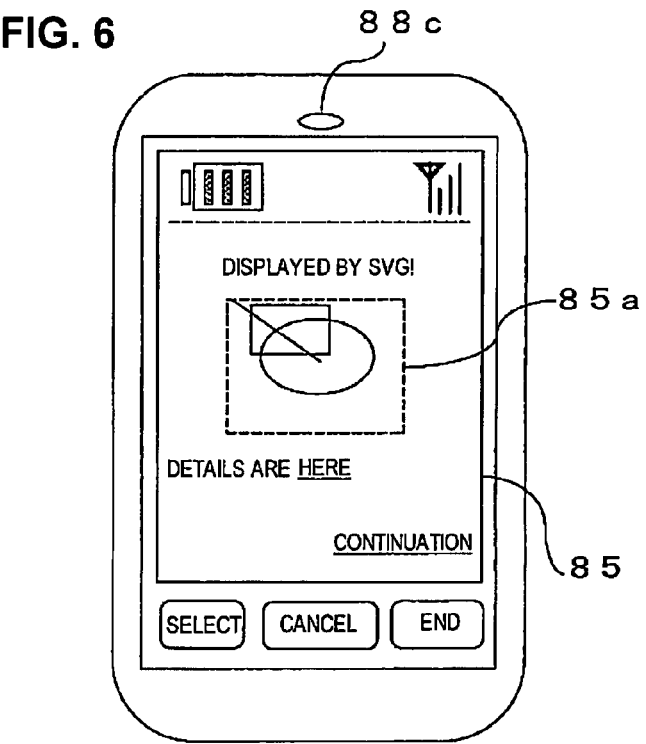
FIG. 6 is a view showing an example of an image displayed on a display unit of the cellular phone terminal device in correspondence to the SVG content.
Figure 7:
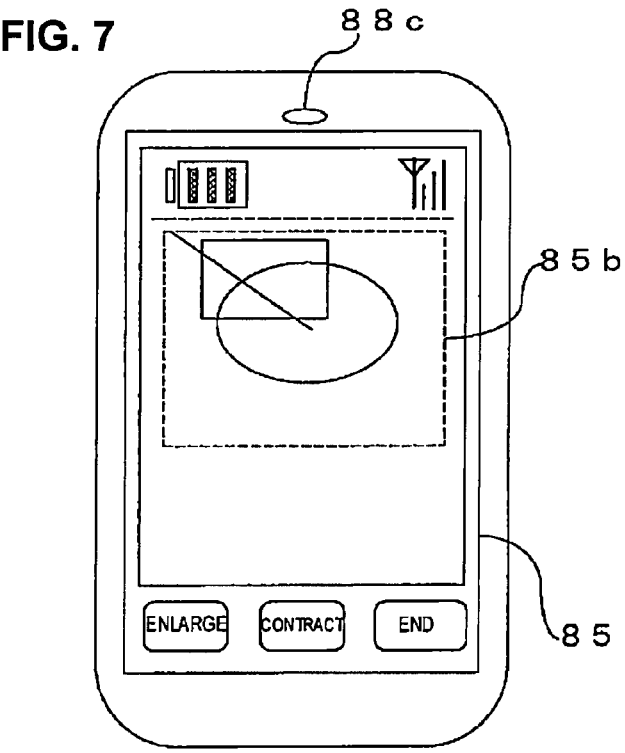
FIG. 7 is a view showing an example of the image displayed on the display unit in correspondence to the SVG content.

Further, the display of the SVG content can be displayed (inline reproduction) as an image 85*a* in a display region (a window) of the browser 300, for example, as shown in FIG. 6. In this state, the SVG content 600 is displayed as an image after being drawn by the drawing definition unit 610, and the link, the anchor and the like defined in the anchor definition unit 620 and the link definition unit 630 are disregarded. In addition to the inline reproduction as mentioned above, the SVG content 600 can be displayed (interactive reproduction) on an independent window by the SVG processing unit 510, for example, as shown in FIG. 7. In the case of the inline reproduction mentioned above, the browser 300 calls out the SVG processing unit 510 so as to display the SVG content in correspondence to the HTML document acquired from the HTTP server 10 or the like, or the HTML document held in the data holding unit 83*b*. On the other hand, in the case of the interactive reproduction, the SVG processing unit 510 displays the SVG content 600 directly acquired from the SVG server 20, or the SVG content 600 held in the SVG data holding unit 83*ba*.

(Communication Confirmation)

As mentioned above, there is a case that a process requiring the communication is defined in the SVG content 600 by the link definition unit 630 or the anchor definition unit 620, however, if this process is executed as it is, there is a problem that charging caused by the communication is done. Since the user does not intend to connect to the network in the case of reproducing the SVG content stored in the SVG data holding unit 83*ba*, such is a problem particularly. Further, the same problem is generated in the case of displaying the HTML document stored in the memory 83, which is the HTML document referring the SVG content stored in the SVG data holding unit 83*ba* as an image. Accordingly, the cellular phone terminal device 80 is structured such as to confirm the user whether or not the user will execute the communication before executing the communication.

Figure 8:
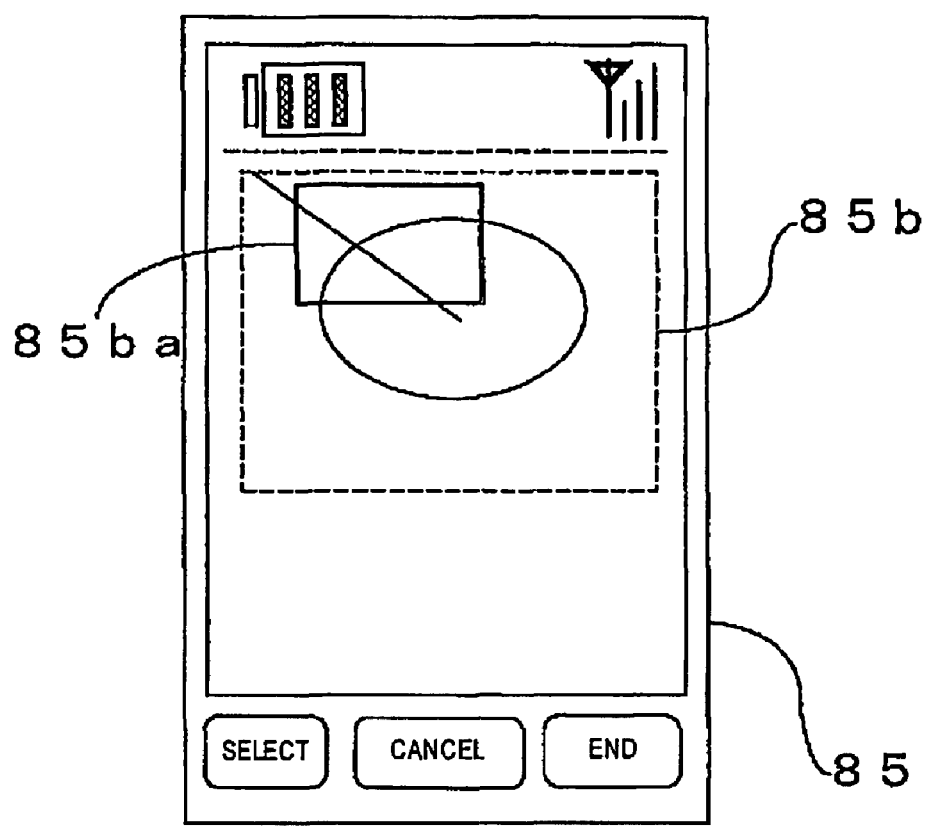
FIG. 8 is a view showing an example of the image displayed on the display unit in correspondence to the SVG content.
Figure 9:
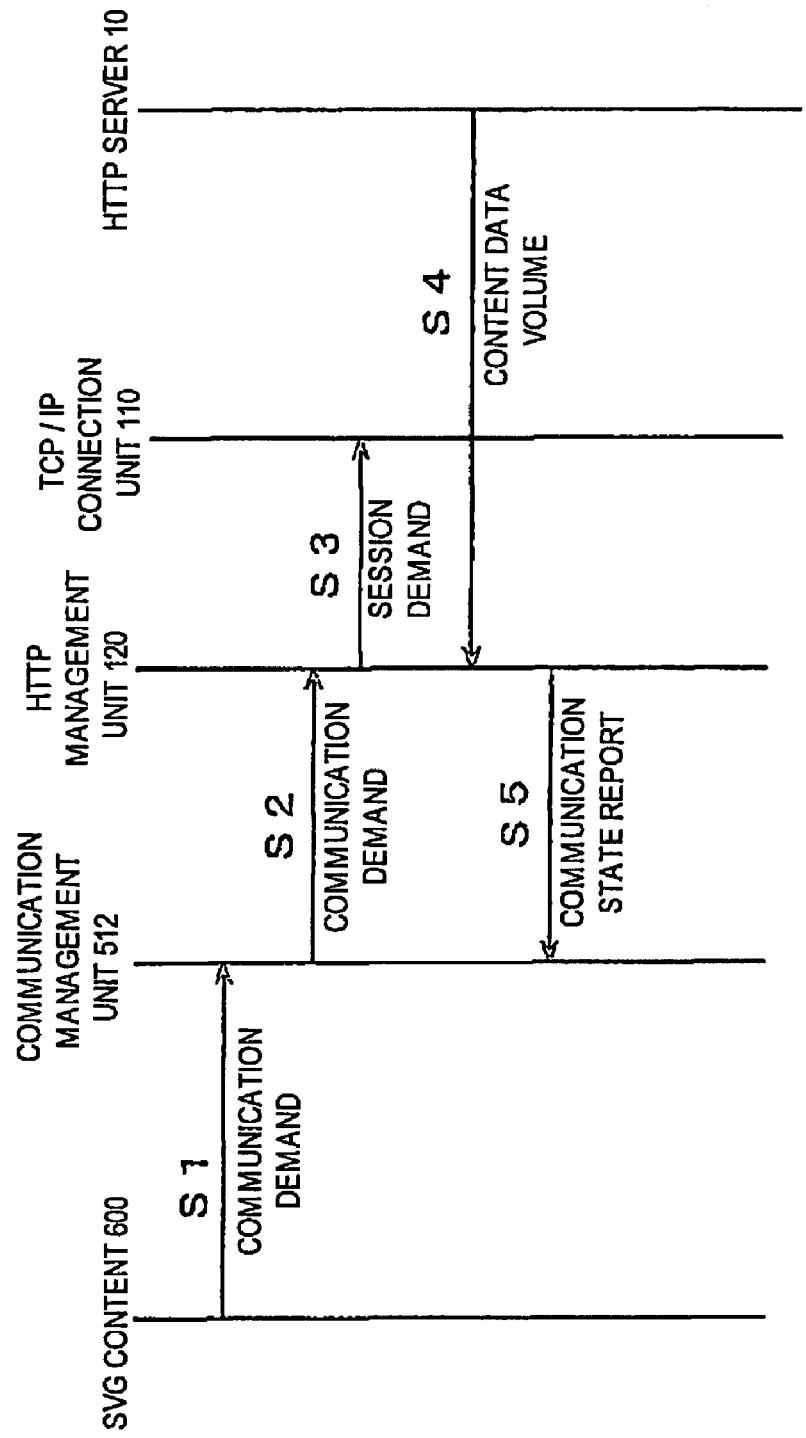
FIG. 9 is a sequence view showing an example of a communication confirmation process in the cellular phone terminal device.
Figure 10:
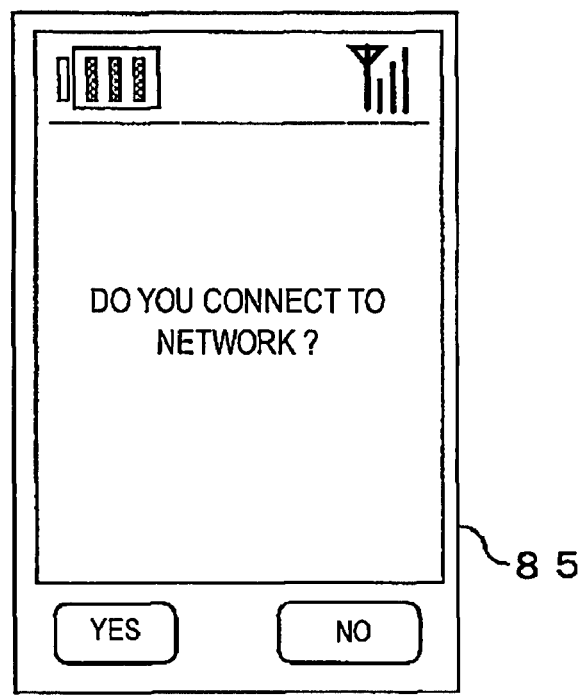
FIG. 10 is a view showing an example of a confirmation image displayed on the display unit.

In the SVG content 600 shown in FIG. 4 mentioned above, the link is defined in the rectangular part corresponding to the link definition unit 630. In the case that the SVG content 600 is interactive reproduced as shown in FIG. 7, if the user operates the operation key 84, for example, the rectangular part becomes to be in a state of a highlight display (an image 85*ba*), as shown in FIG. 8. In this state, if the user commands "select" (S1 in FIG. 9), the communication management unit 512 displays an image (a confirmation image) requesting the user a confirmation input whether or not the user will connect to the network, for example, as shown in FIG. 10.

As mentioned above, in this cellular phone terminal device 80, in the case that the process requiring the network connection such as the link or the like is defined in the SVG content 600, it is possible to prevent the communication from being executed while the user does not know so as to be charged, by displaying the image requesting the user the confirmation input before executing the connection. Accordingly, it is possible to contribute to prevention of the operation which is not intended by the user.

In the case that the user refuses the network connection in response to the confirmation image, the link defined by the link definition unit 630 is not referred, and the data of the address defined by the link definition unit 630 is not acquired. On the other hand, in the case that the user allows the network connection, the communication management unit 512 demands the data of the address defined by the link definition unit 630 from the server device designated in the address. Specifically, the communication management unit 512 first demands the communication from the HTTP management unit 120 (S2 in FIG. 9), and the HTTP management unit 120 demands an establishment of a session from the TCP/IP connection unit 110 (S3), and transmits the HTTP request to the HTTP server 10 so as to demand the content (for example, the HTML document) to be linked, after the session is established. At this time, for example, in the case of the link defined by the tag <a>, the UA header adding unit 122 sets the user agent name of the HTTP request to "Browser" indicating the browser 300, and in the case of the link defined by the tag <image>, sets to "SVG" indicating the SVG processing unit 510.

In response to this demand, the HTTP server 10 first reports the attribute such as the demanded content type (Content-Type or the like), the volumetric capacity or the like to the HTTP management unit 120 (S4). The report (HTTP response) is divided into the addressed applications 300, 400, 510 and 520 in correspondence to the Content-Type within the HTTP response. For example, if the Content-Type is "text/html", the HTTP response is supplied to the browser 300, if it is "image/svg", the HTTP response is supplied to the SVG processing unit 510, if it is "application/x-shockwave-flash", the HTTP response is supplied to the Flash processing unit 520, and if it is "text/vnd.sun.j2me.app-descriptor", the HTTP response is supplied to the Java (trade mark) execution environment 400.

Figure 11:
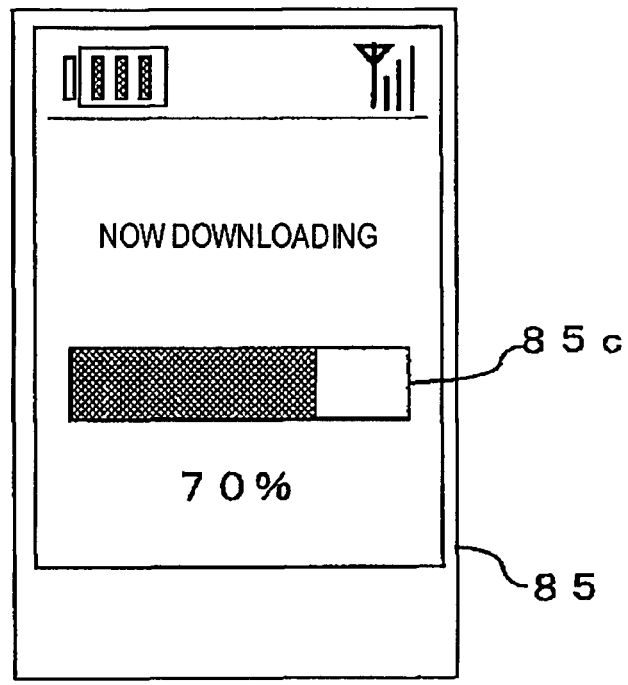
FIG. 11 is a view showing an example of an image indicating a communication state displayed on the display unit.

Thereafter, the content is supplied to the target application (the browser 300 in the case that the Content-Type is "text/html"). During this time, the communication state report unit 121 of the HTTP management unit 120 reports the receiving state of the content to the communication management unit 512 (S5). In accordance with this, the communication management unit 512 commands to the communication state display unit 513 so as to display an image 85*c* (a progress bar) indicating the receiving state of the content, for example, as shown in FIG. 11. Accordingly, the user can know the receiving state of the content.

Figure 12:
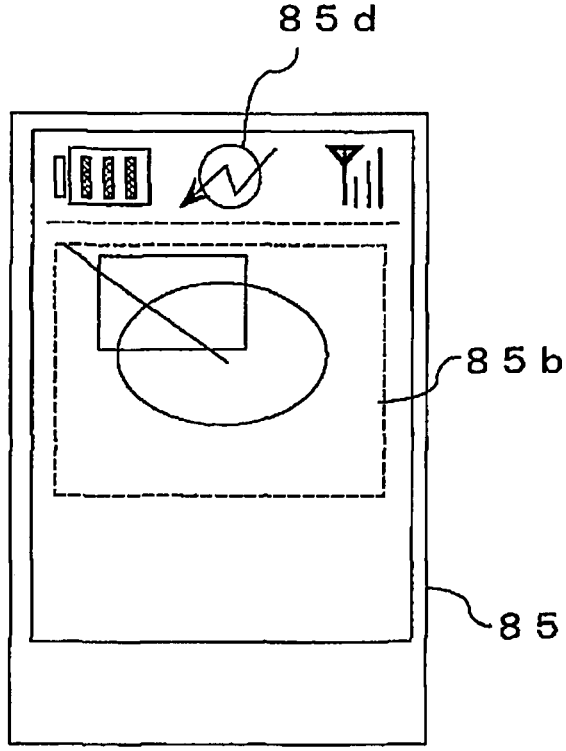
FIG. 12 is a view showing another example of the image indicating the communication state.

Alternatively, the structure may be made such as to display an icon (an image 85*d*) indicating that the communication is being done, for example, as shown in FIG. 12, in place of displaying the progress bar. Accordingly, the user can know that the content is under receipt.

(Capacity Limit)

Figure 13:
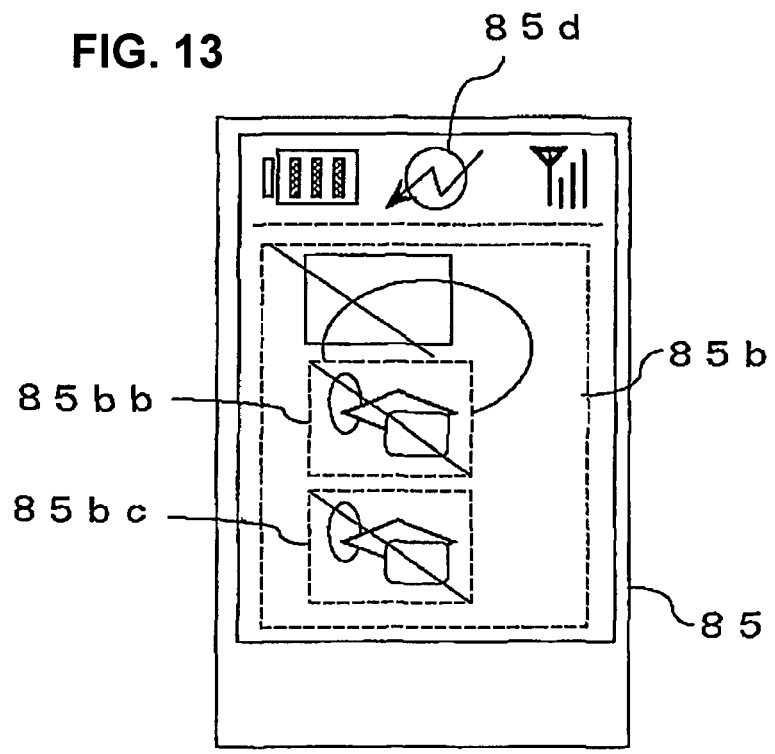
FIG. 13 is a view showing an example of the image displayed on the display unit of the cellular phone terminal device in correspondence to the SVG content.
Figure 14:
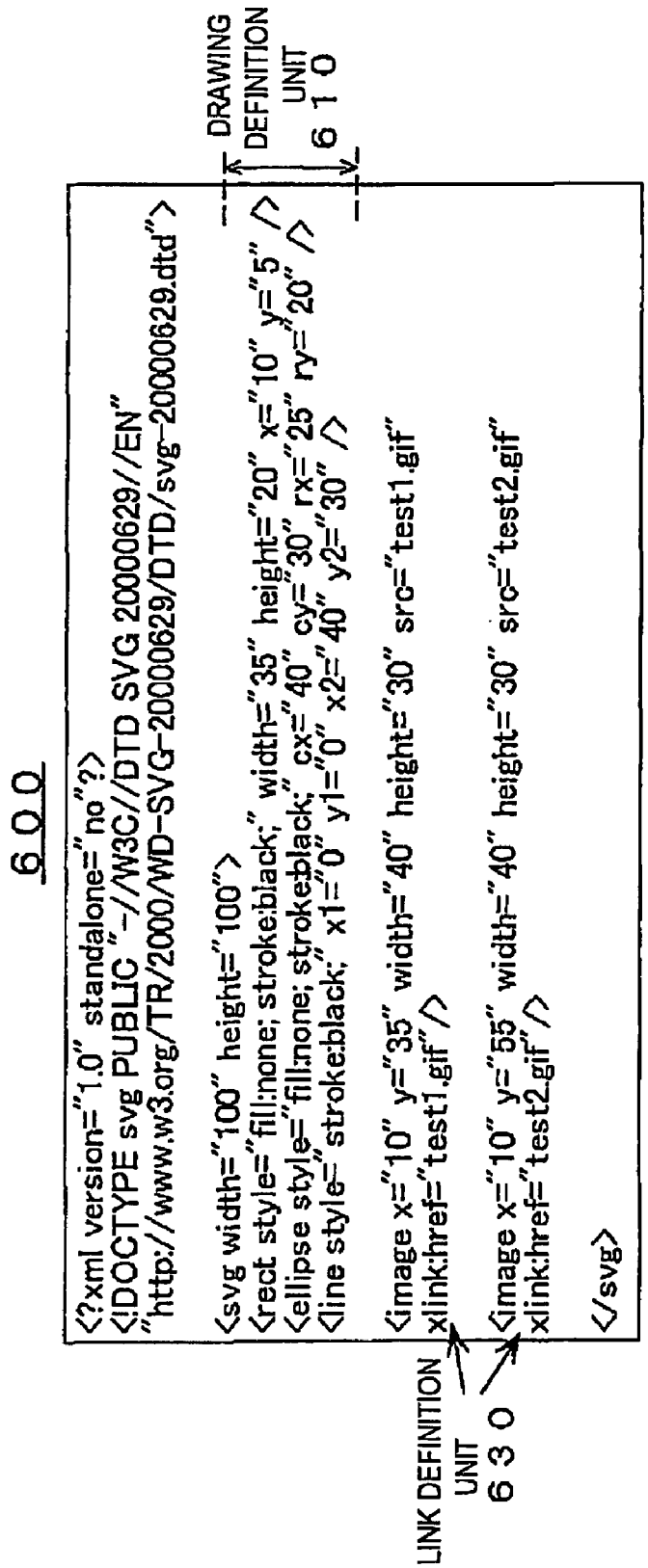
FIG. 14 is a view showing an example of the SVG content.

In the SVG content, the structure is made such that it is possible to inline display (images 85*bb* and 85*bc*) by referring to the external image data or the like, for example, as shown in FIGS. 13 and 14. However, in the cellular phone terminal device 80, there is provided an upper limit of the data volume per content for the reason of the limit of the memory capacity.

In the SVG content, if the inline displayed data (link data) is increased, there is a case that a data volume as a whole of one content (all the link data referred to the SVG content) becomes very larger. Even in this case, if the upper limit is only provided per the individual data, the SVG processing unit 510 acquires all the link data in a state in which each of the SVG content and the link data does not exceed the upper limit of the data volume. As a result, there is a possibility that a free memory capacity is reduced, and the operation becomes unstable.

Figure 15:
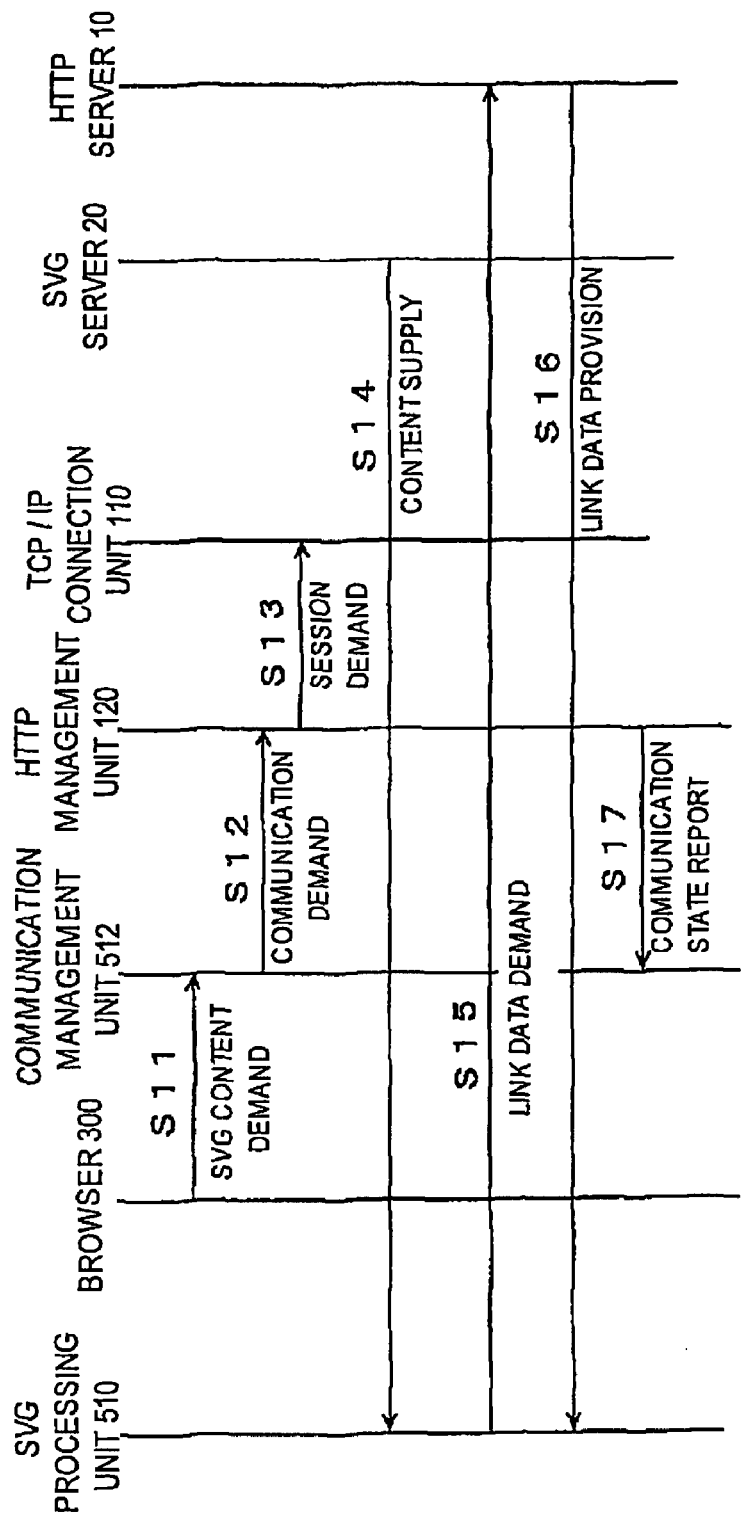
FIG. 15 is a sequence view showing an example of a data volume limiting process of the content in the cellular phone terminal device.

Accordingly, in this cellular phone terminal device 80, there is provided a data volume limit (a threshold value) of the SVG content 600 and the whole data linked within the SVG content 600. For example, as shown in FIG. 15, the browser 300 demands the SVG content 600 (S11), the communication management unit 512 first demands the communication from the HTTP management unit 120 in correspondence thereto (S12), the HTTP management unit 120 demands the establishment of the session from the TCP/IP connection unit 110 (S13), and the SVG content is supplied from the SVG server 20 after the session is established (S14). The SVG processing unit 510 demands the data inline displayed (for example, "test1.gif" and "test2.gif" defined by the <image> tag in FIG. 14) from the HTTP server 10 in correspondence to the definition of the link definition unit 630 within the SVG content (S15). At this time, the information which the UA header adding unit 122 adds as the user agent name of the HTTP request is "SVG" indicating the SVG processing unit 510. If the SVG content corresponding to the response is provided to the SVG processing unit 510 in correspondence to the Content-Type in the HTTP response supplied from the HTTP server 10 in response thereto (S16), the SVG processing unit 510 inline displays the link data in the SVG content.

Figures 16, 17:
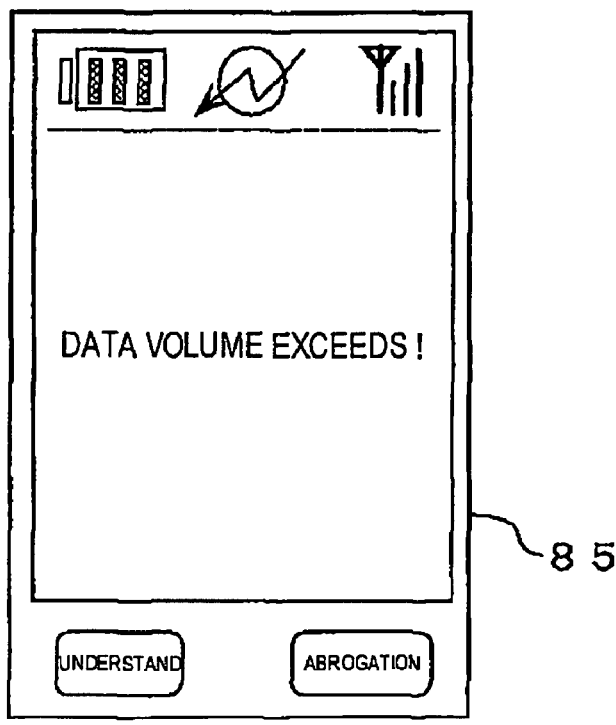
FIG. 16 is a view showing an example of a warning image displayed on the display unit of the cellular phone terminal device.
FIG. 17 is a view showing an example of the SVG content.

At a time of acquiring the SVG content and the link data (S14 to S16) mentioned above, the communication state report unit 121 of the HTTP management unit 120 monitors whether or not the total of the SVG content and the link data exceeds the upper limit of the data volume. Further, if the total exceeds the upper limit of the data volume, the communication state report unit 121 reports the fact to the communication management unit 512 (S17). If this report is received, the communication management unit 512 makes the HTTP management unit 120 disconnect the session, and cancels the acquirement of the link data thereafter. Further, the communication management unit 512 commands the communication state display unit 513 to display the image indicating that the data volume exceeds the upper limit, for example, as shown in FIG. 16. Accordingly, it is possible to report to the user the fact that the data volume exceeds the upper limit.

As mentioned above, in the case that the data volume exceeds the upper limit, the image according to the SVG content and the link data which have been then acquired is displayed. Alternatively, the SVG content and the link data which have been then acquired may be wasted. Further, these operations may be switched in response to the command of the button in FIG. 16, or may be automatically switched in correspondence to the setting.

The description is given above of the case of executing the data volume limit of the SVG content and the whole of the link data, however, a limit time for acquiring them may be set. In this case, the communication state report unit 121 counts a time after acquiring the SVG content, disconnects the session in the case that the acquirement of all the link data is not finished within the limit time, and finishes the acquirement of the link data.

(Anchor)

Further, the structure is made such that it is possible to define an anchor such as a dialer anchor (for example, FIG. 17) dialing a predetermined phone number, a mailer anchor (for example, FIG. 20) transmitting a message of an e-mail to a predetermined address, or the like, in the SVG content 600. For example, at a time of reproducing the SVG content 600 shown in FIG. 17, the structure is made such that the dialing is executed after confirming the user whether or not the user dials, by executing a display (an image 85*e*) of the phone number, for example, as shown in FIG. 18, at a time of selecting the rectangle (the image 85*ba*) in FIG. 8 mentioned above corresponding to the anchor definition unit 620.

Figure 18:
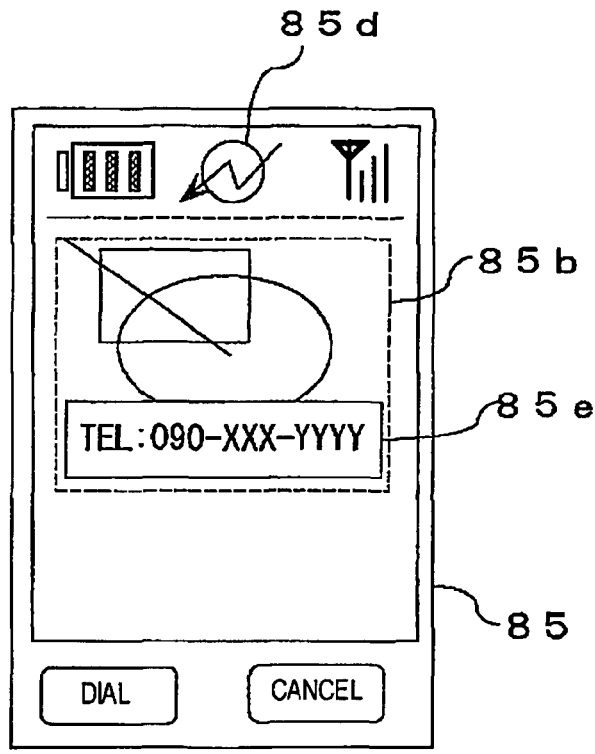
FIG. 18 is a view showing an example of a dial confirmation image displayed by a dial processing unit executed by the cellular phone terminal device.
Figure 19:
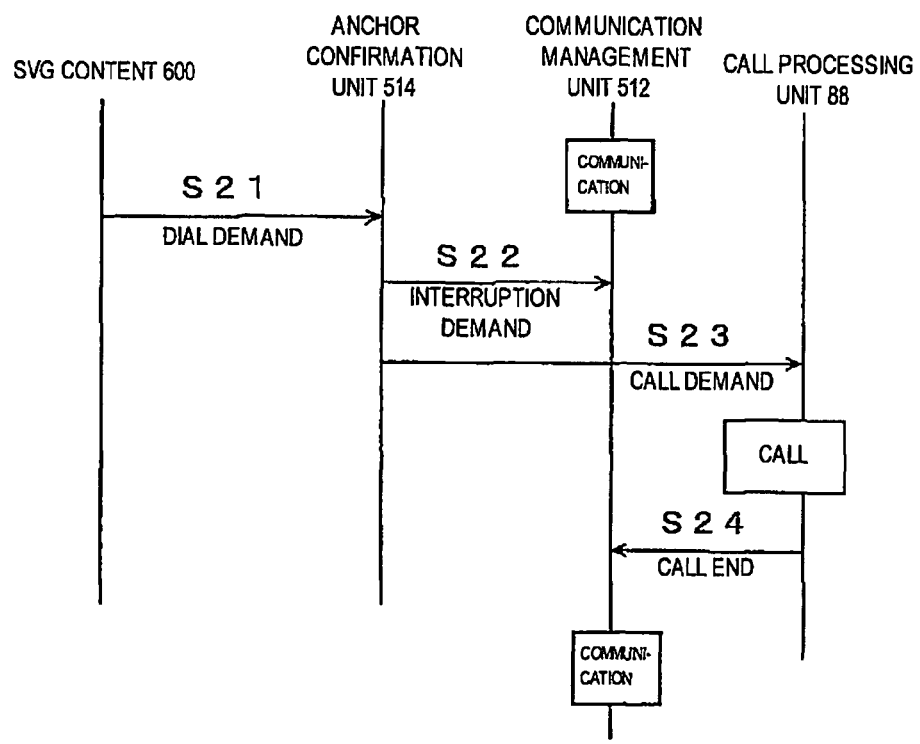
FIG. 19 is a sequence view showing an example of a dial anchor process in the cellular phone terminal device.

Specifically, for example, as shown in FIG. 19, if the dialer anchor defined by the anchor definition unit 620 is commanded (S21) during the reproduction (including during the communication) of the SVG content 600, the anchor conformation unit 514 displays the conformation image shown in FIG. 18 mentioned above. If the user commands "dial", the anchor confirmation unit 514 demands an interruption of the communication by the communication management unit 512 during the other communication (S22). If the communication is temporarily interrupted, the anchor confirmation unit 514 demands a calling from the call processing unit 88 via the dial processing unit 140, and executes the calling process upon connection to the phone number defined by the anchor definition unit 620. If the calling is finished, the call processing unit 88 reports to the communication management unit 512 via the dial processing unit 140 the fact that the calling is finished (S24), and the communication management unit 512 restarts the communication in response thereto. Accordingly, in the cellular phone terminal unit 80, it is possible to temporarily finish the communication so as to execute the calling process in correspondence to the dialer anchor even during the communication on the basis of the reproduction of the SVG content 600 by the SVG processing unit 510.

The dial processing unit 140 is structured such as to display the phone number to be dialed in the same manner as the confirmation display mentioned above, even in the normal calling process, and dial after the confirmation of the user is input. Accordingly, it is possible to provide the user interface having a uniformity with respect to the user by executing the process of the dialer anchor in accordance with the procedure as mentioned above. Therefore, it is possible to easily understand the operation and it is possible to contribute to improvement of the operability.

Further, the mailer anchor is defined by the anchor definition unit 620, for example as shown in FIG. 20. If the mailer anchor is commanded during the reproduction of the SVG content 600, the anchor confirmation unit 514 is commanded so as to report to the e-mail client 200 the transmission target address defined in the mailer anchor, and form the message. In correspondence thereto, the e-mail client 200 displays an edit display of the mail, for example, as shown in FIG. 21. If the user appropriately inputs the content of the message, and commands the transmission, the e-mail client 200 transmits the message via the IMAP and SMTP management unit 130.

If the transmission of the message is finished, the e-mail client 200 reports to the anchor confirmation unit 514 the fact. In correspondence thereto, the SVG processing unit 510 restarts the reproduction of the SVG content 600. Accordingly, in this cellular phone terminal device 80, it is possible to transmit the message corresponding to the mailer anchor even during the reproduction of the SVG content 600.

The description is given by exemplifying the dialer anchor and the mailer anchor, however, even in the case of the anchor such as a player anchor activating a medium player reproducing sound data, an image data, or the like, it is possible to execute a process designated by the anchor by temporarily canceling the reproduction of the SVG content 600.

(Limit of Multiple Activation)

The SVG content is structured, for example, as shown in FIG. 22, such that it is possible to execute the inline reproduction by defining the other SVG content. In the general-purpose information processing device such as the PC or the like, it is possible to reproduce the SVG content in a multiplexing manner in accordance with a multiprocessing, however, in the cellular phone terminal device, it is hard to reproduce a plurality of SVG contents in a multiplexing manner, due to a limit of the processing capacity of the MPU or the like.

Accordingly, in the cellular phone terminal device 80, the structure is made such that the reproduction of the other SVG contents defined in the SVG content is not executed in the case of the inline reproduction mentioned above, and only one of the SVG contents defined in the SVG content can be reproduced, for example, as shown in FIG. 23, in the case of the interactive reproduction. Specifically, the attribute management unit 515 provides an attribute state corresponding to the activation state of the SVG content to be reproduced to the operation limit unit 516. The operation limit unit 516 invalidates a link definition unit 630 (xlink: href attribute) in the SVG content in a subordinate reproduction state, in correspondence to the attribute state.

Figure 24:
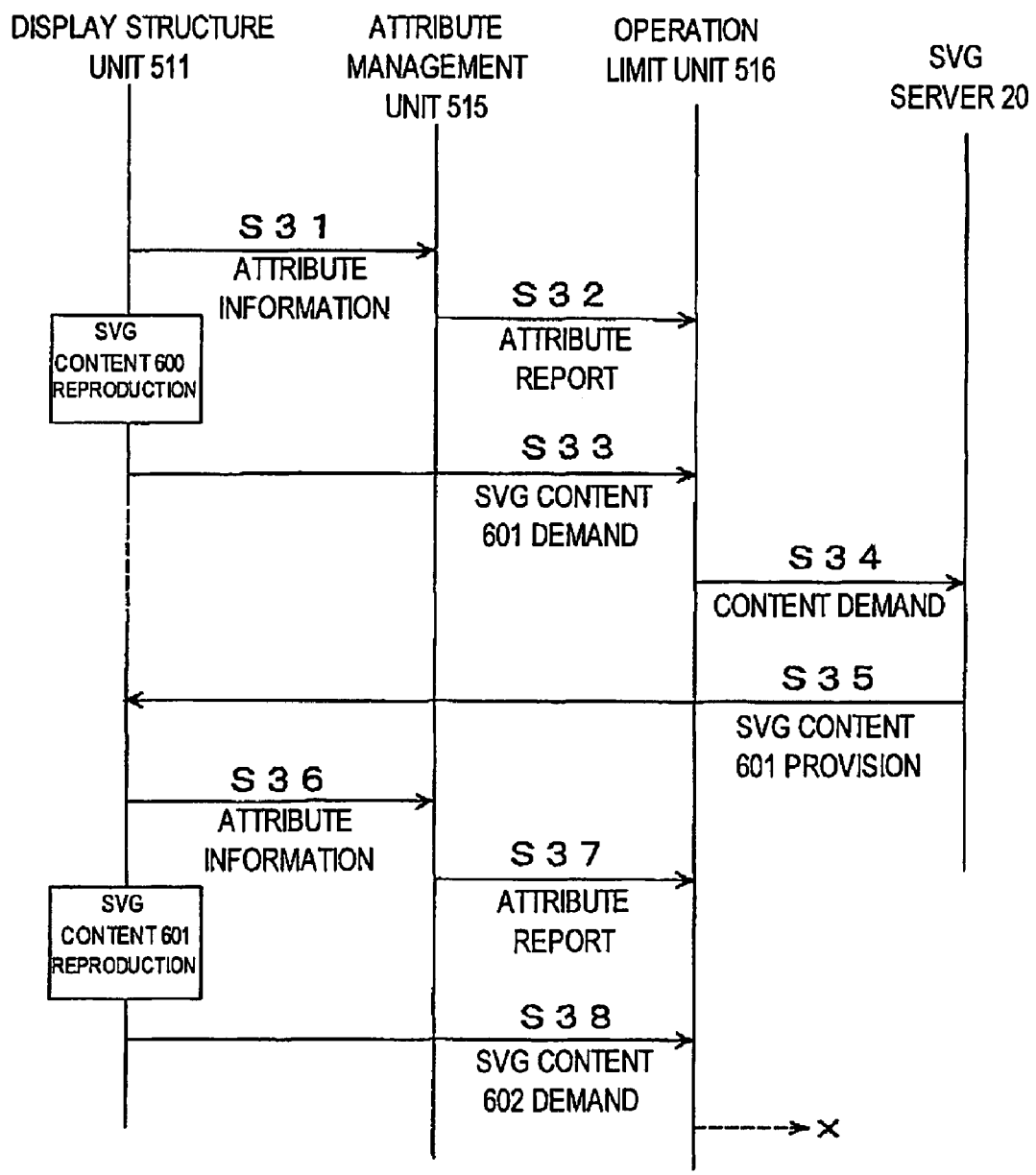
FIG. 24 is a sequence view showing an example of a limiting process of a multiple activation in the cellular phone terminal device.

In the example shown in FIG. 3 mentioned above, the SVG content 601 is linked by the link definition unit 630 of the SVG content 600, and the SVG content 602 is further linked from the SVG content 601. If it is intended to interactive reproduce the SVG content in this state, the attribute management unit 515 first searches the attribute information of the SVG content 600 (for example, "test1.svg") (S31), for example, as shown in FIG. 24. Since the SVG content 600 is in a most superior reproduction state, in a state in which the operation of the SVG content 600 is started first, the attribute management unit 515 reports to the operation limit unit 516 the fact (S32). In the case that the definition of the inline reproduction exists within the SVG content 600, the operation limit unit 516 is in a state of executing the display in accordance with the definition, in response to the report.

Thereafter, the display structure unit 511 executes the drawing process in accordance with the drawing definition unit 610 within the SVG content 600. If the definition inline reproducing the SVG content 601 (for example, "test2.svg")

exists within the SVG content 600, the display structure unit 511 demands the SVG content 601 in correspondence thereto (S33). At this time, the information which the UA header adding unit 122 adds as the user agent name of the HTTP request is "SVG" indicating the SVG processing unit 510.

The operation limit unit 516 demands the SVG content 601 from the SVG server 20 in response to the demand (S34). If the SVG content 601 corresponding to the response is supplied to the display structure unit 511 in correspondence to the Content-Type in the HTTP response supplied from the SVG server 20 in response thereto (S35), the attribute management unit 515 searches the attribute information of the SVG content 601 (S36). Since the SVG content 601 is the subordinate reproduction state called out in accordance with the definition of the inline reproduction in the SVG content 600, the attribute management unit 515 reports to the operation limit unit 516 the fact (S37). Accordingly, there is generated a state in which the definition of the inline reproduction is not executed even if it exists in the SVG content 601.

Thereafter, the display structure unit 511 executes the drawing process in accordance with the drawing definition unit 610 within the SVG content 601. If the definition inline reproducing the SVG content 602 (for example, "test3.svg") exists within the SVG content 601, the display structure unit 511 demands the SVG content 602 in response thereto (S38). However, the operation limit unit 516 disregards the demand, and the demand of the SVG content 602 is not provided to the SVG server 20.

In accordance with the process mentioned above, in the cellular phone terminal device 80, it is possible to limit a frequency at which the SVG content is reproduced in a chaining manner. In the structure in which the SVG content can be reproduced in the chaining manner, there is a possibility that the native environment (OS) side can not comprehend what the currently active SVG content is, and can not understand what content the response to the processing demand is to be returned to, and the operation becomes unstable. Accordingly, it is possible to contribute to the stability of the operation by limiting the frequency at which the SVG content is reproduced in the chaining manner.

In this case, the process which the operation limit unit 516 invalidates is not limited to the link definition unit 630 (xlink: href attribute) mentioned above, but can be applied to the link with respect to the HTML document, the image and the like. With regard to these processes, it is possible to prevent the chaining activation of the other applications such as the browser 300, the e-mail client 200 and the like, by adding the limit of the operation in correspondence to the reproduction state of the SVG content.

(Limit of Inline Reproduction)

Further, the SVG content 601 inline reproduced within the SVG content 600 is only displayed as the image, and the operation input defined by the operation definition unit 640 is invalidated. For example, in the SVG content 600 (the image 85*b*) and the SVG content 601 (the image 85*x*) in FIG. 23 mentioned above, an operation input "OK?" is defined in the operation definition unit 640, in each of them, however, the operation input of the inline reproduced SVG content 601 is invalidated. As a result, only the operation input defined in the SVG content 600 corresponding to the most superior reproduction state is validated.

Figure 25:
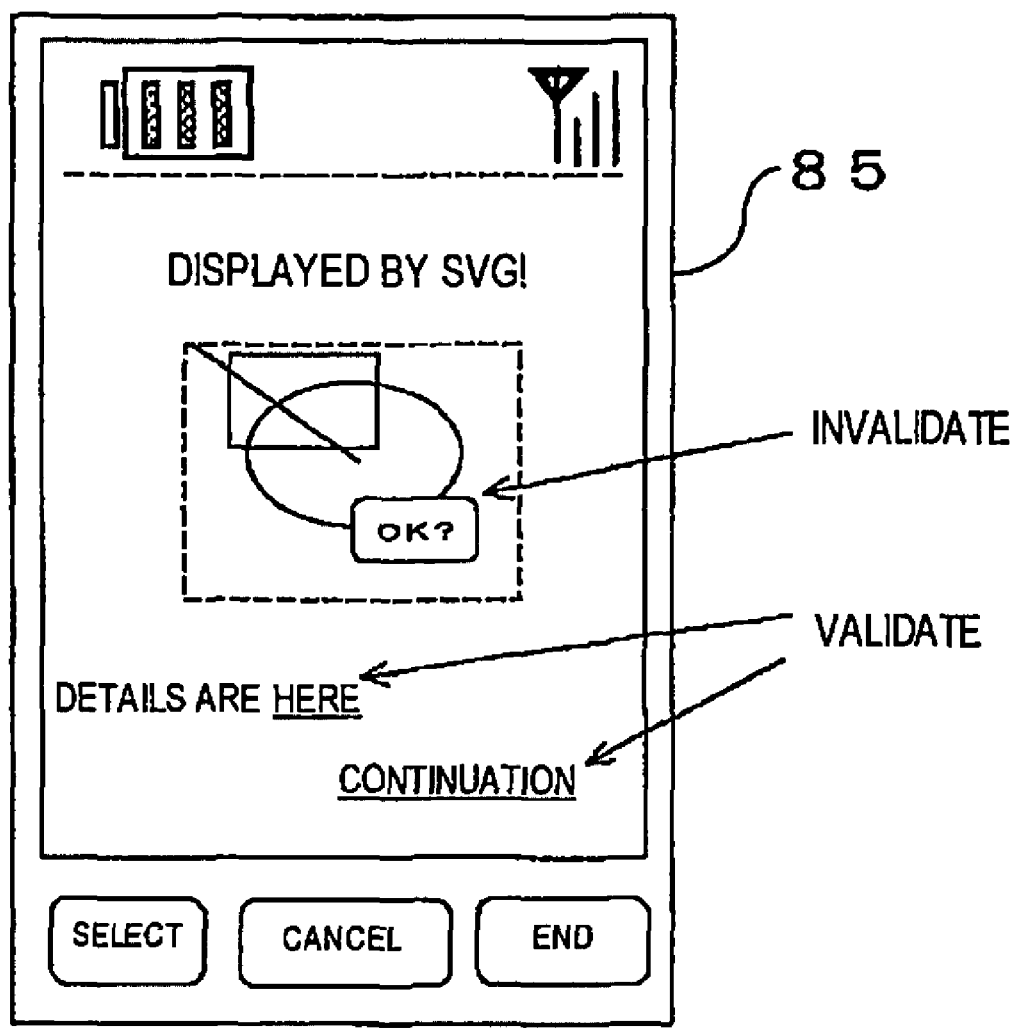
FIG. 25 is a view showing an example of an inline reproduced SVG content.

Further, for example, as shown in FIG. 25, even if the operation input "OK?" is defined in the SVG content inline reproduced in the Web content such as the HTML document or the like, the operation input is invalidated. As a result, only the operation input defined in the Web content corresponding to the most superior reproduction state is validated.

Figure 26:
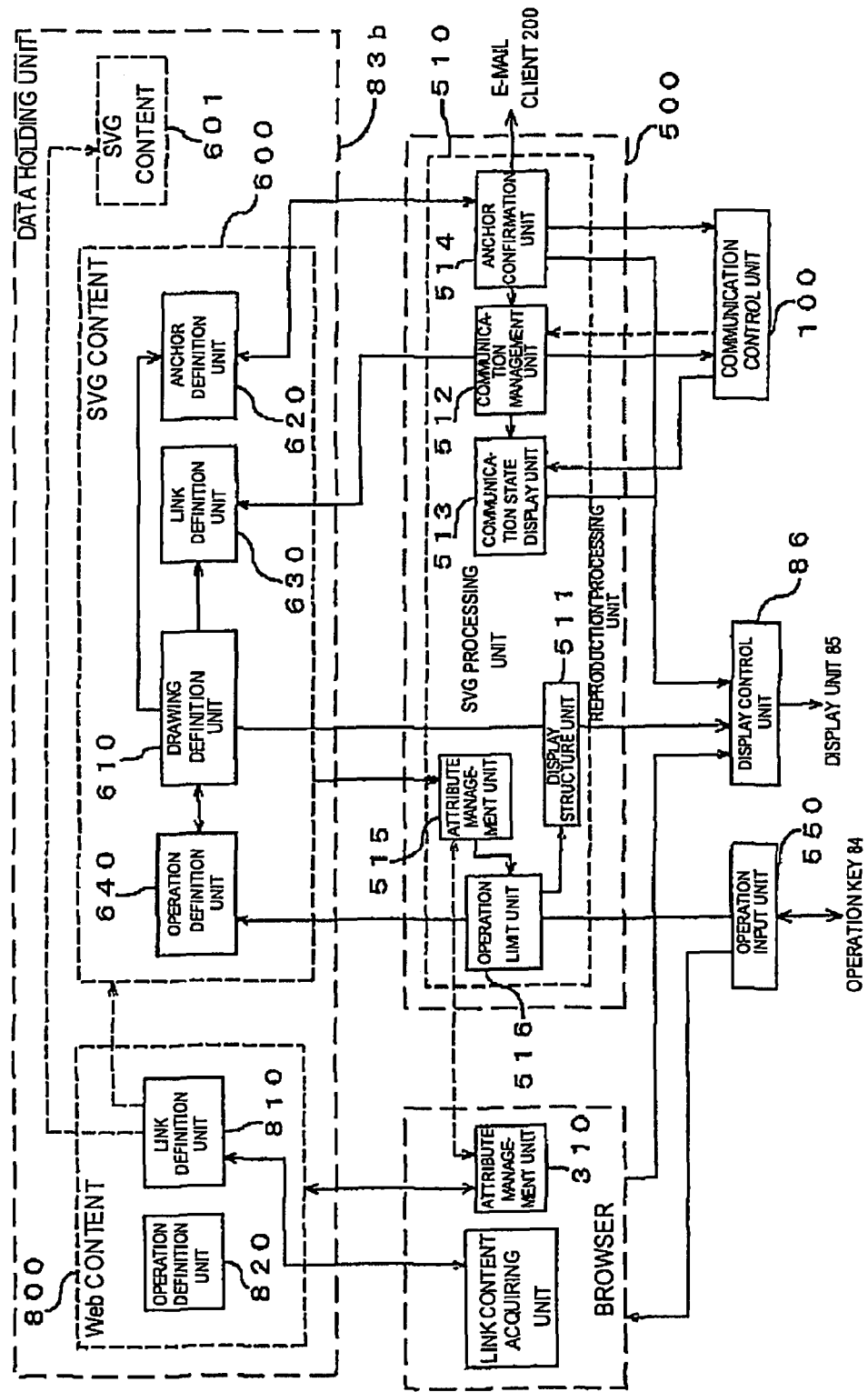
FIG. 26 is a block diagram showing a structure example of a browser or the like executed in the cellular phone terminal device.

In order to achieve the operation mentioned above, for example, as shown in FIG. 26, the browser 300 is provided with an attribute management unit 310 working with the attribute management unit 515 mentioned above. The attribute management unit 310 reports to the attribution management unit 515 that the SVG content 600 is inline reproduced in accordance with the definition of the link definition unit 810 within the Web content 800. The attribute management unit 515 reports to the operation limit unit 516 the attribute information in response to the report, and the operation limit unit 516 invalidates the process of the operation input (for example, the link definition unit 630 in FIG. 4 mentioned above or the like) within the SVG content corresponding to the subordinate reproduction state in accordance with the attribute information.

Figure 27:
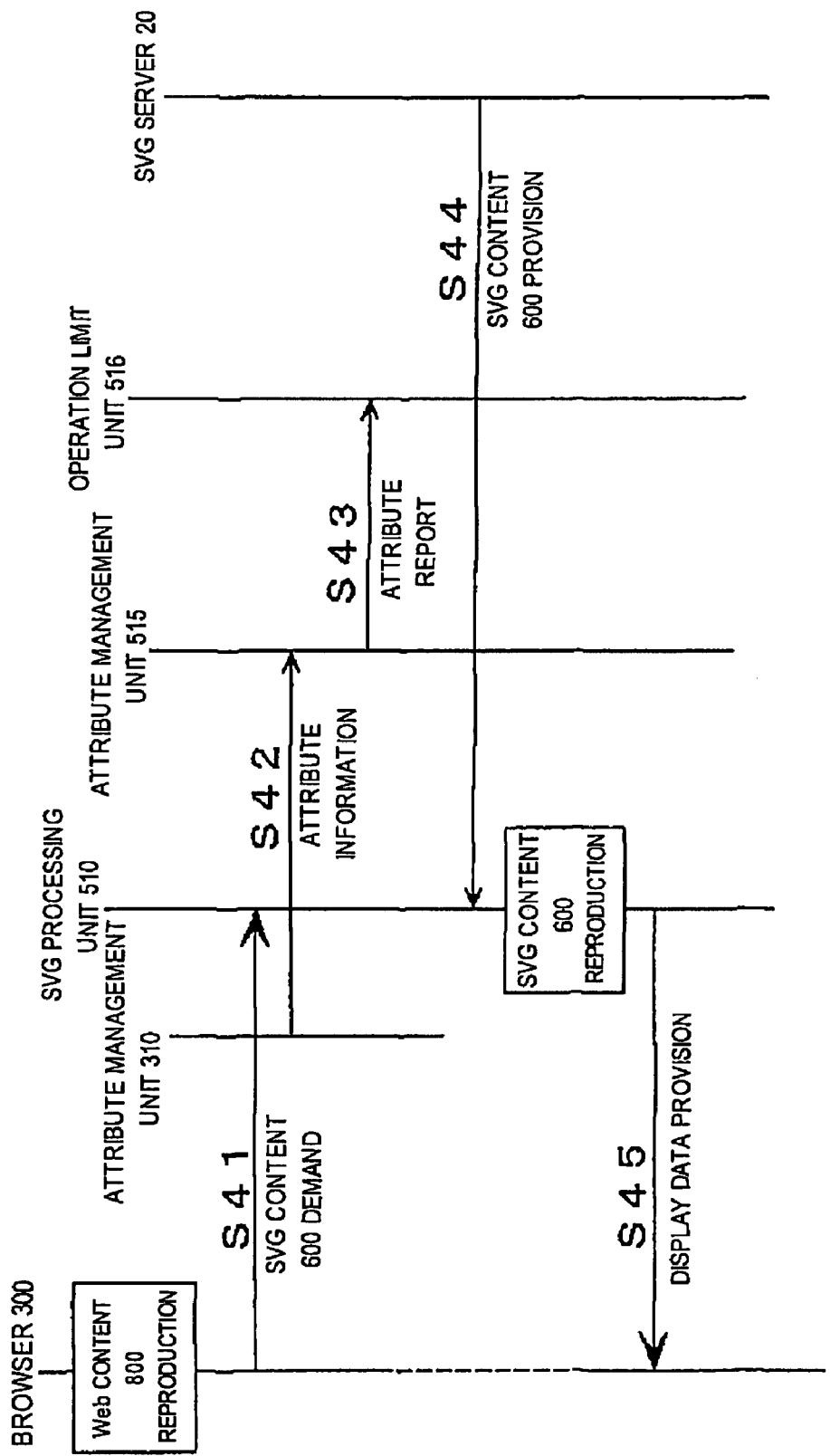
FIG. 27 is a sequence view showing an example of a limiting process of an inline reproduction in the cellular phone terminal device.

For example, if the inline reproduction definition (OBJECT DATA . . . ) of the SVG content 600 exists in the link definition unit 810 during the reproduction of the Web content 800 shown in FIG. 5 mentioned above, the browser 300 demands the data of the display image of the SVG content 600 from the SVG processing unit 510 (S41), for example, as shown in FIG. 27. At this time, the attribute management unit 310 reports to the attribute management unit 515 the fact that the attribute management unit 310 is activated on the basis of the demand from the browser 300 (S42). Since the SVG content 600 is in the subordinate reproduction state called out in accordance with the definition of the inline reproduction in the Web content 800, the attribute management unit 515 reports to the operation limit unit 516 the fact (S43). Accordingly, even if the operation definition unit 640 exists in the SVG content 600, there comes to a state in which the operation input is invalidated.

Thereafter, if the SVG content 600 is provided from the SVG server 20 (S44), the SVG processing unit 510 reproduces the SVG content 600, however, invalidates the operation definition unit 640 so as to generate the display image and provides to the browser 300 (S45). If the process of the operation input is defined within the Web content 800, the browser 300 validates the operation input in accordance with this definition.

Accordingly, in the cellular phone terminal device 80, it is possible to validate only the operation input of the content in the superior reproduction state, and invalidate the operation input of the content in the subordinate reproduction state. In the general-purpose information processing device such as the PC or the like, even if the operation input of the content in the subordinate reproduction state is validated, it is possible to select the operation input within the individual content by the pointing device such as a mouse or the like. On the contrary, in the cellular phone terminal device 80, it is hard to select the operation input within the individual content due to the restriction of the operation key 84. Accordingly, it is possible to contribute to the improvement of the operability of the user by validating only the operation input of the content in the superior reproduction state, as mentioned above.

(Details of Flash Processing Unit 520)

Figure 28:
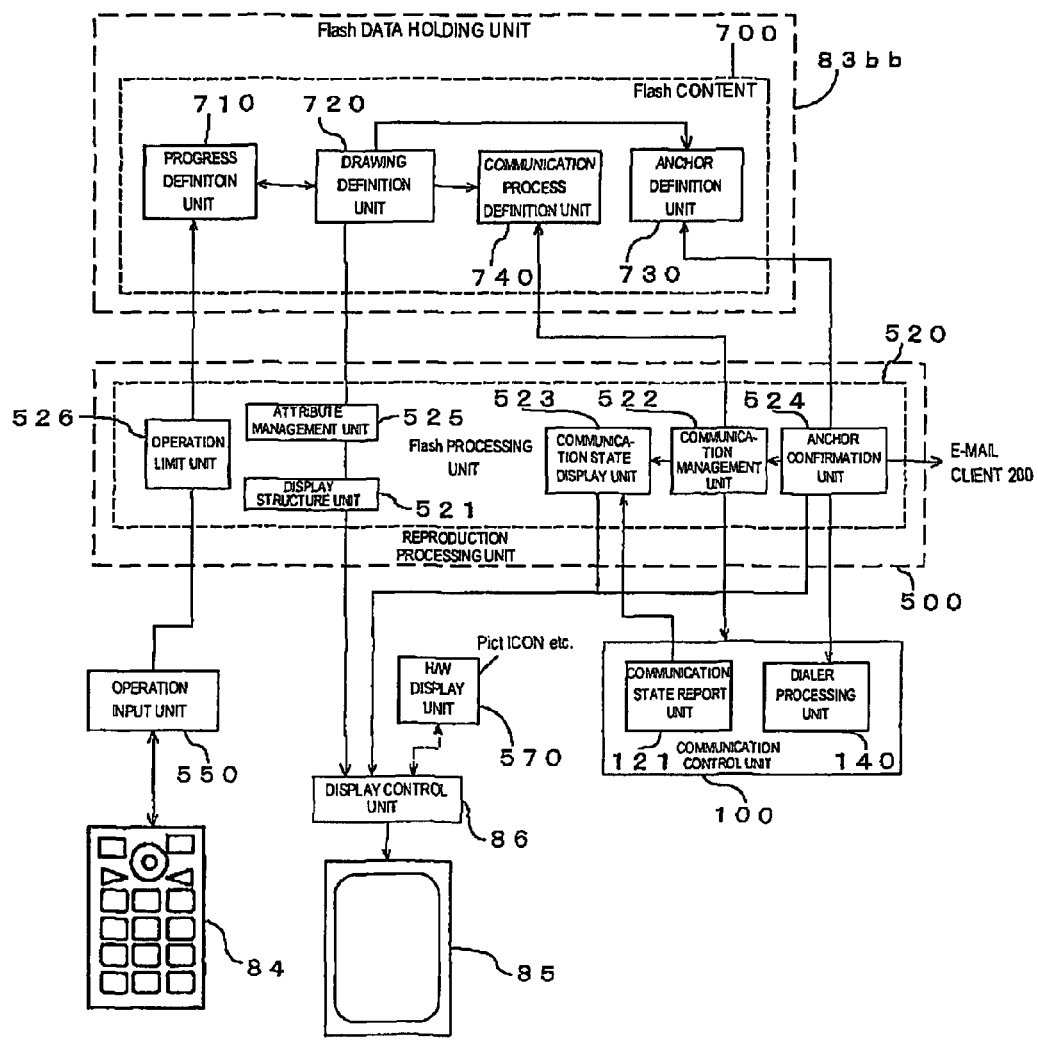
FIG. 28 is a view showing a structure example of a Flash processing unit constituting the cellular phone terminal device.

In the cellular phone terminal device 80, the structure is made such that it is possible to reproduce the Flash content in addition to the SVG content 600. The Flash processing unit 520 mentioned above has a display structure unit 521 constructing a display image in accordance with a definition of a drawing definition unit 720, a communication management unit 522 executing in accordance with a definition of a communication process definition unit 740, a communication state display unit 523 executing a display of a communication state in accordance with the report from the communication state report unit 121 of the communication control unit 100, an anchor confirmation unit 524 executing a control of the dial processing unit 140 and the e-mail client 200 in accordance with a definition of an anchor definition unit 730, an attribute management unit 525 controlling a process by the display structure unit 521 in accordance with an operation state, and an operation limit unit 526 executing limitation of an operation in accordance with a command from the attribute management unit 525,for example, as shown in FIG. 28.

Further, the Flash content 700 has a progress definition unit 710 including a definition of a progress of a whole content, a drawing definition unit 720 including a definition of a drawing process, an anchor definition unit 730 including the definition of the dial anchor, the mailer anchor and the like mentioned above, and a communication process definition unit 740 including a definition of a link or the like with respect to an external content. The progress definition unit 710 to the communication process definition unit 740 a restructured by a script described by a language called as Action Script.

Figures 29, 30:
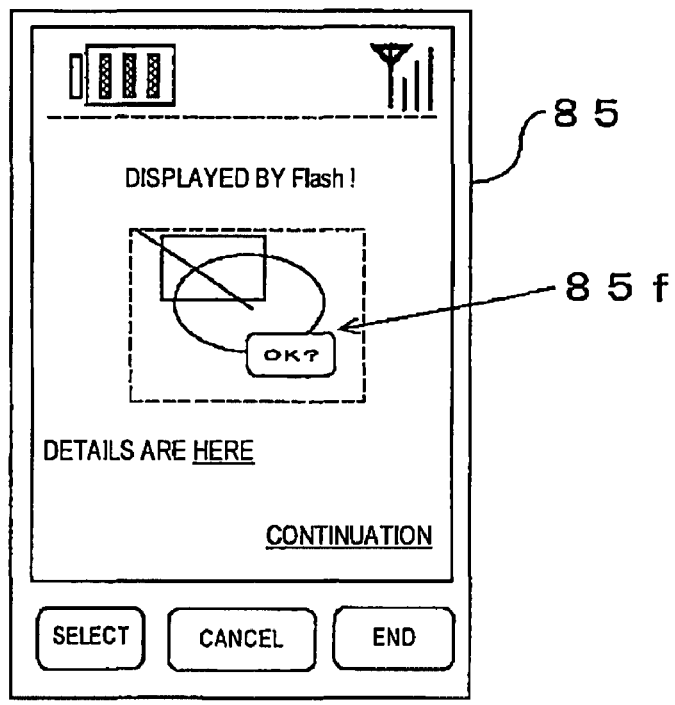
FIG. 29 is a view showing an example of a Web content in which a link with respect to a Flash content is described.
FIG. 30 is a view showing an example of the inline reproduced Flash content.

The Flash content 700 mentioned above is acquired by the browser 300 from the Flash server 30 in accordance with the link information (OBJECT DATA . . . ) defined in the HTML document provided by the HTTP server 10, for example, as shown in FIG. 29. The HTML document and the acquired Flash content 700 are structured such as to be stored in the Flash data holding unit 83*bb* within the memory 83.

Figures 31, 32, 33:
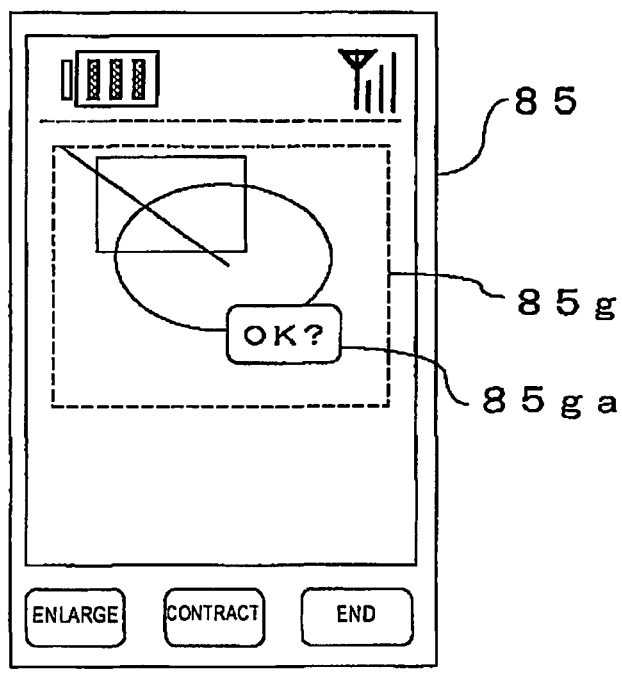
FIG. 31 is a view showing an example of the interactive reproduced Flash content.
FIG. 32 is a view showing an example of a command invalidated by an operation limiting unit of the Flash processing unit.
FIG. 33 is a view showing an example of a command validated by the operation limiting unit.

The display of the Flash content 700 can be displayed (inline reproduction) as an image 85*f* in the window by the browser 300, for example, as shown in FIG. 30. In this state, the Flash content 700 is displayed as an image after being drawn by the drawing definition unit 720, and the link, the anchor and the like defined by the anchor definition unit 730 and the communication process definition unit 740 are disregarded. In addition to the inline reproduction mentioned above, the Flash content 700 can be displayed (interactive reproduction) on the independent window 85*g* by the Flash processing unit 520, for example, as shown in FIG. 31. In the case of the inline reproduction, the browser 300 calls out the Flash processing unit 520 so as to display the Flash content in correspondence to the HTML document provided by the communication control unit 100 or the HTML document held in the data holding unit 83*b*. On the other hand, in the case of the interactive reproduction, the Flash processing unit 520 directly acquires the Flash content 700 from the Flash server 30, or displays the Flash content 700 held in the Flash data holding unit 83*bb*.

(Communication Confirmation)

It is possible to associate, for example, the definition of the communication processing unit 740 with an image 85*ga* of a button in FIG. 31 or the like. However, in order to prevent the charging due to the communication from being generated while the user does not know, the cellular phone terminal device 80 is structured such as to confirm the user whether or not the user will execute the communication, before executing the communication.

Specifically, a part of the definition of the communication process definition unit 740 coordinated to the image or the like is disregarded. For example, in the case that a getURL command (a command displaying the content of the designated URL by the browser 300 or the like) exists in the communication process definition unit 740, the command is invalidated when executing the command without condition, as shown in FIG. 32, and the command is validated only when a fixed condition (on(Press): the case that the image of the button is commanded from the user) is satisfied, as shown in FIG. 33.

Further, if the button or the like is selected, and the getURL command is executed, the communication management unit 522 displays an image (a confirmation image) requiring to the user the confirmation input whether or not the user will connect to the network, for example, as shown in FIG. 10 mentioned above.

In the case that the user refuses the network connection in response to the confirmation image, the external link corresponding to the communication process definition unit 740 is not referred. On the other hand, in the case that the user allows the network connection, the communication management unit 522 demands the content of the address defined in the communication process defining unit 740 from the server device designated in the address. If the content is provided in response thereto, the communication state display unit 523 displays the image 85*c* (the progress bar) indicating the content receiving state, for example, as shown in FIG. 11 mentioned above. Accordingly, the user can know the receiving state of the content.

Alternatively, the structure may be made such as to display the icon (the image 85*d*) indicating that the communication is being done, for example, as shown in FIG. 12, in place of displaying the progress bar. Accordingly, the user can know that the content is under receipt.

Accordingly, in the cellular phone terminal device 80, the Flash processing unit 520 does not acquire the content associated with the image 85*ga* or the like unless the user allows the network connection. Therefore, it is possible to prevent the communication from being executed without the command of the user, and it is possible to contribute to the prevention of the operation which is not intended by the user.

(Anchor)

Further, in the Flash content 700, it is also possible to associate the operation such as the dial operation or the like with the image of the button or the like, in the same manner as the case of the SVG content mentioned above. In the case of the dialer anchor, the anchor confirmation unit 524 displays the similar conformation image to that in FIG. 18 mentioned above. If the user selects "dial" in response thereto, the application monitor unit 124 commands the Flash process unit 520 to cancel the reproduction of the content, and makes the dial processing unit 140 execute the calling process such as the call or the like. If the calling is finished, the application monitor unit 124 makes the Flash processing unit 520 restart the reproduction of the content. Alternatively, the structure may be made such that the application monitor unit 124 makes the Flash processing unit 520 finish the reproduction of the content at a time when the user selects "dial".

Accordingly, in the cellular phone terminal device 80, it is possible to execute the calling process in correspondence to the dialer anchor even under the reproduction of the Flash content by the Flash processing unit 520.

(Limit of Inline Reproduction)

In the case of inline reproducing the Flash content 700 as shown in FIG. 30 mentioned above, in the general-purpose information processing device such as the PC or the like, it is possible to select the operation input within the individual content by the pointing device such as the mouse or the like even if the operation input of the content (the inline reproduced Flash content 700) under the subordinate reproduction state is validated. On the contrary, in the cellular phone terminal device 80, it is hard to select the operation input within the individual content due to the restriction of the operation key 84. Accordingly, in the cellular phone terminal device 80, the operation input of the inline reproduced Flash content 700 is invalidated. Specifically, there is invalidated a partial command of press, Keypress or the like in the definitions of the progress definition unit 710, the anchor definition unit 730, the communication process definition unit 740 and the like of the Flash content 700.

Therefore, it is possible to prevent the operation which is not intended by the user from being executed on the basis of a competition of the operation inputs of the content (for example, the Web content) in the superior reproduction state and the Flash content in the subordinate reproduction state, by validating only the operation input of the content (for example, the Web content executed by the browser 300) in the superior reproduction state. Further, since it is possible to execute the inline reproduction itself only by invalidating the operation input, the Flash content can be reproduced, so that it is possible to contribute to the improvement of the convenience of the user.

(Details of Operation of UA Header Adding Unit 122)

In the SVG content, it is possible to define the link with respect to the external file such as the Web content or the like by the tag <a>, in the link definition unit 630 mentioned above. For example, in the example, shown in FIG. 4 mentioned above, the link with respect to the URL "http://www.w3.org" is defined by the tag <a> in the link definition unit 630. At a time of demanding the content corresponding to the link target defined by the tag <a> mentioned above, the communication management unit 512 of the SVG processing unit 510 generally sets the HTTP connection, thereafter transmits the HTTP request with the user agent name (user agent header) of the SVG processing unit 510 being added thereto to the HTTP server. Therefore, the HTTP management unit 120 generally returns the response from the HTTP server to the SVG processing unit 510.

Further, in the Flash content, it is possible to define the link with respect to the other contents by the getURL( ) command in the communication process definition unit 740 mentioned above. The content corresponding to the link target defined by the getURL( ) command should be reproduced by an application corresponding to its kind, however, since the HTTP request demanding the content mentioned above is provided by the Flash processing unit 520, the response to the HTTP request is generally returned to the Flash processing unit 520.

However, in the case that the response from the HTTP server is the Web content, if the SVG processing unit 510 and the Flash processing unit 520 transmitting the HTTP request receive, there is a risk to make it impossible to execute a normal reproduction operation. On the other hand, there is a case that the content of the link target is not constituted by the Web content, but constituted by the content displayed by the other applications such as the SVG processing unit 510, the Flash processing unit 520 and the like. However, in the case mentioned above, even if the browser 300 receives, it is possible to command the corresponding application to display the content.

The link target by the gag <a> in the SVG content or the getURLo command in the Flash content is the Web content in many cases, and the link target by the tag <image> in the other SVG contents or the command such as the loadMovie( ),loadvriables( ) or the like in the Flash content is the content which can be reproduced by the application reproducing the content mentioned above, in many cases.

Accordingly, in the cellular phone terminal device 80, at a time when the SVG processing unit 510 demands the content of the link target defined by the tag <a> in the link definition unit 630, the UA header adding unit 122 sets the user agent name in the HTTP request so as to correspond to the browser 300 (for example, to "Browser"). Further, in the cellular phone terminal unit 80, at a time when the Flash processing unit 520 demands the content of the link target defined by the getURL( ) command in the communication process definition unit 740, the UA header adding unit 122 also sets the user agent name in the HTTP request so as to correspond to the browser 300.

A description will be given below by exemplifying an operation at a time of demanding the Web content from the SVG content. For example, as shown in FIG. 34, at a time when the communication management unit 512 of the SVG processing unit 510 demands the content corresponding to the URL "http://www.w3.org" defined by the tag <a> in the link definition unit 630 (S51), the UA header adding unit 122 generates the HTTP request by setting the user agent name to that of the browser 300 so as to transmit to the HTTP server 10 (S52). The HTTP request specificallybecomes to, for example, "GET http://www.w3.org HTTP/1.1 3G V-90xVF . . . Browser . . . ". In this case, "V-90xVF" in the HTTP extension header is characters indicating a model name of the cellular phone terminal device, and "3G" is characters indicating a generation of the cellular phone terminal device. Further, "Browser" in the extension header is characters indicating that the transmission source of the HTTP request is the browser 300. This part is set to "SVG" if the transmission source is constituted by the SVG processing unit 510, and is set to "Flash" if the transmission source is constituted by the Flash processing unit 520.

The HTTP server 10 transmits the response (HTTP response) in correspondence to the user agent name in the HTTP request (S53). For example, the response to the HTTP request from the browser 300 (the user agent name "Browser") is the Web content. The Content-Type in the HTTP response corresponding to the Web content is "text/html". If the HTTP response is received, the routing processing unit 123 selects the application providing the data of the response in correspondence to the Content-Type in the HTTP response. In this case, it is provided to the browser 300 corresponding to the Content-Type "text/html" (S54). The browser 300 displays the provided Web content.

Further, in the link definition unit 630 of the SVG content, at a time of demanding the content of the link target defined by the gag <image>, the UA header adding unit 122 transmits the HTTP request by setting the user agent name to "SVG" indicating the SVG processing unit 510. The Content-Type in the HTTP response thereto is, for example, "image/svg". If the HTTP response is received, the routing processing unit 123 provides the data in the response to the SVG processing unit 510. The SVG processing unit 510 reproduce the provided SVG content.

Accordingly, in the cellular phone terminal device 80, it is possible to provide the content of the link target defined by the link definition unit 630 or the communication process definition unit 740 to the suitable applications 300, 510 and 520 in correspondence to the definition of the link (the tag in the SVG or the command in the Flash). Therefore, it is possible to prevent disturbance of the application so as to prevent the operation which is not intended by the user.

Further, in the cellular phone terminal device 80, since the suitable user agent name is added to the HTTP request, the server side providing the content can recognize the application of the transmission target, and it is possible to return the suitable response in correspondence to the application of the demand side of the content. Accordingly, the suitable response is returned to the application, and it is possible to contribute to the prevention of the operation which is not intended by the user.

(Details of Operation of Application Monitor Unit 124)

Since the SVG processing unit 510 corresponds to an application executed above the HTTP as shown in FIG. 2 mentioned above, the SVG processing unit 510 can be operated while mutually associating the SVG content with the content executed by the other applications 300 and 400. For example, it is possible to inline display the SVG content during the reproduction of the Web content, it is possible to execute the communication with the network during the reproduction of the SVG content, and it is possible to execute the operation of newly activating the browser 300 on the basis of the response.

In the general-purpose information processing unit such as the PC or the like, it is possible to simultaneously execute a plurality of applications, however, in the cellular phone terminal device, it is hard to simultaneously execute a plurality of applications due to the processing performance of the MPU, the restriction of the memory capacity and the like. Accordingly, if the response to the demand with respect to the network in the SVG content demands the operation of the other application, there is a case that the cellular phone terminal device side can not respond.

Accordingly, in the cellular phone terminal device 80, the application monitor unit 124 monitors the operation state of each of the applications 300, 400 and 510, and monitors which of these applications is activated. Further, the application monitor unit 124 monitors a transition between the applications, and interrupts or stops the operation of the previous application at a time of translation to the other application. Therefore, it is possible to execute the application of the transition target.

Specifically, for example, the application monitor unit 124 has the operations of the SVG processing unit 510 and the Java (trade mark) execution environment 400 under control of the browser 300, and interrupts or stops the operation of the SVG processing unit 510 in the case that the browser 300 is activated from the SVG processing unit 510 and the case that the Java (trade mark) execution environment 400 is activated from the SVG processing unit 510. Alternatively, in the case of transition to the SVG processing unit 510 from the other application, it activates the SVG processing unit 510.

Accordingly, in the cellular phone terminal device 80, it is possible to prevent uncontrolled operation of the application on the basis of a synergetic effect of the SVG processing unit 510 and the Flash processing unit 520, and the other applications 300 and 400 working with the applications 510 and 520. Therefore, it is possible to maintain the suitable application execution environment. Accordingly, it is possible to prevent the operation which is not intended by the user.

Modified Embodiment

In the description mentioned above, the structure is made such that the SVG server 20 and the Flash server 30 providing the content are provided independently from the HTTP server 10, however, the structure may be made such that the SVG content and the Flash content are stored in the HTTP server 10, and the HTTP server 10 provides the data of these contents.

The description is given above of the example in which the present invention is applied to the cellular phone terminal device, however, the applied subject of the present invention is not limited to this, but the present invention can be applied, for example, to a portable terminal device such as the PDA or the like, a personal computer and the like. Particularly, in the portable terminal device such as the PDA or the like, since the processing performance of the MPU and the memory capacity are limited in the same manner as the cellular phone terminal device, it is possible to achieve the same operations and effects as those of the cellular phone terminal device by applying the present invention.

What is claimed is:

1. An information wireless terminal device comprising:
a drawing means executing a drawing process in accordance with a drawing definition information in page description data stored on the information wireless terminal device, the drawing process being executed to generate a first image according to the drawing definition information without requiring a network connection, and wherein the first image is displayable on the information wireless terminal device without requiring the network connection;
a data demanding means that provides a demand for demanding data from a provision device connected via a network in accordance with a link definition information in said page description data, the link definition information providing an address of the data that is acquirable from the provision device over the network connection;
a confirming means that requests input from a user to confirm whether or not the network connection is to be executed in accordance with said demand, the confirming means requesting the input from the user at the information wireless terminal device and prior to initiating the network connection in accordance with the demand; and
a providing means providing the demand from said demanding means to said provision device in the case that the input from the user selects the network connection, wherein a second image is displayed on the information wireless terminal device, the second image corresponding to data provided over the network connection in accordance with the link definition information, wherein if the input from the user selects refusal of the network connection, the data is not acquired from the provision device over the network connection and the first image is displayed on the image information wireless terminal, and wherein if the input from the user selects execution of the network connection, the data is acquired from the provision device over the network connection and the second image is displayed on the image information wireless terminal, wherein the information wireless terminal device further comprises an anchor processing means activating an external application in correspondence to the anchor definition information in said page description data.

2. An information wireless terminal device as claimed in claim 1, wherein the information wireless terminal device further comprises:
a data acquiring means capable of acquiring the data from the provision device connected via the network in accordance with the link definition information in said page description data;
a data volume monitoring means detecting a total of data volumes of the page description data and all said data acquired in accordance with the link definition information in said page description data; and
a canceling means canceling the acquirement of said data by said data acquiring means, in the case that the total of said data volumes detected by said data volume monitoring means exceeds a predetermined threshold value.

3. An information wireless terminal device as claimed in claim 1, wherein said providing means is provided with an adding means adding an identification information corresponding to said link definition information or said demanded data to the demand transmitted to said providing means.

4. An information wireless terminal device as claimed in claim 1, wherein the information wireless terminal device further comprises a link processing means activating an application in correspondence to the link definition information in said page description data.

5. An information wireless terminal device as claimed in claim 4, wherein the information wireless terminal device further comprises a frequency limit means limiting a frequency of activation of an application by said link processing means during reproduction of the page description data.

6. An information wireless terminal device as claimed in claim 4, wherein the information wireless terminal device further comprises an operation limit means limiting an operation input in the application in correspondence to a display mode of the display by said activated application.

7. An information wireless terminal device as claimed in claim 4, wherein the information wireless terminal device further comprises a control means controlling an operation state of the application before translation in correspondence to the transition between said mutually associable applications.

8. An information wireless terminal device, comprising:
   a drawing processing unit that executes a drawing process in accordance with a drawing definition information in page description data stored on the information wireless terminal device, the drawing process being executed to generate a first image according to the drawing definition information without requiring a network connection, and wherein the first image is displayable on the information wireless terminal device without requiring the network connection;
   a data demanding processing unit that provides a demand for demanding data from a provision device connected via a network in accordance with a link definition information in the page description data, the link definition information providing an address of the data that is acquirable from the provision device over the network connection;
   a confirmation processing unit that requests input from a user to confirm whether or not the network connection is to be executed in accordance with the demand, the confirmation processing unit requesting the input from the user at the information wireless terminal device and prior to initiating the network connection in accordance with the demand; and
   a providing processing unit that provides the demand from the data demanding processing unit to the provision device in the case that the input from the user selects the network connection, wherein a second image is displayed on the information wireless terminal device, the second image corresponding to data provided over the network connection in accordance with the link definition information, wherein if the input from the user selects refusal of the network connection, the data is not acquired from the provision device over the network connection and the first image is displayed on the image information wireless terminal, and wherein if the input from the user selects execution of the network connection, the data is acquired from the provision device over the network connection and the second image is displayed on the image information wireless terminal, wherein the information wireless terminal device further comprises:
   an anchor processing unit that activates an external application in correspondence to the anchor definition information in said page description data.

9. The information wireless terminal device as claimed in claim 8, wherein the information wireless terminal device further comprises:
   a data acquiring processing unit that acquires the data from the provision device connected via the network in accordance with the link definition information in said page description data;
   a data volume monitoring processing unit that detecting a total of data volumes of the page description data and all said data acquired in accordance with the link definition information in said page description data; and
   a canceling processing unit that cancels the acquirement of said data by said data acquiring processing unit in the case that the total of said data volumes detected by said data volume monitoring processing unit exceeds a predetermined threshold value.

10. The information wireless terminal device as claimed in claim 8, wherein said providing processing unit is provided with an adding unit that adds an identification information corresponding to said link definition information or said demanded data to the demand transmitted to said providing processing unit.

11. The information wireless terminal device as claimed in claim 8, further comprising:
    a link processing unit that activates an application in correspondence to the link definition information in said page description data.

12. The information wireless terminal device as claimed in claim 11, further comprising:
    a frequency limit processing unit that limits a frequency of activation of an application by said link processing unit during reproduction of the page description data.

13. The information wireless terminal device as claimed in claim 11, further comprising:
    an operation limit processing unit that limits an operation input in the application in correspondence to a display mode of the display by said activated application.

14. The information wireless terminal device as claimed in claim 11, further comprising:
    a controller that controls an operation state of the application before translation in correspondence to the transition between said mutually associable applications.

* * * * *